United States Patent
Park et al.

(10) Patent No.: US 10,158,878 B2
(45) Date of Patent: Dec. 18, 2018

(54) METHOD FOR STORING MOTION INFORMATION AND METHOD FOR INDUCING TEMPORAL MOTION VECTOR PREDICTOR USING SAME

(71) Applicant: LG ELECTRONICS INC., Seoul (KR)

(72) Inventors: Joonyoung Park, Seoul (KR); Seungwook Park, Seoul (KR); Jaehyun Lim, Seoul (KR); Jungsun Kim, Seoul (KR); Younghee Choi, Seoul (KR); Jaewon Sung, Seoul (KR); Byeongmoon Jeon, Seoul (KR); Yongjoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/945,390

(22) Filed: Apr. 4, 2018

(65) Prior Publication Data

US 2018/0227594 A1 Aug. 9, 2018

Related U.S. Application Data

(63) Continuation of application No. 15/804,588, filed on Nov. 6, 2017, now Pat. No. 9,973,776, which is a
(Continued)

(51) Int. Cl.
*H04N 19/52* (2014.01)
*H04N 19/50* (2014.01)
(Continued)

(52) U.S. Cl.
CPC .......... *H04N 19/52* (2014.11); *H04N 19/109* (2014.11); *H04N 19/11* (2014.11); *H04N 19/176* (2014.11);
(Continued)

(58) Field of Classification Search
None
See application file for complete search history.

(56) References Cited

U.S. PATENT DOCUMENTS

| 6,765,965 B1 | 7/2004 | Hanami et al. |
| 2006/0029137 A1 | 2/2006 | Lee et al. |
| (Continued) | | |

FOREIGN PATENT DOCUMENTS

| CN | 1976454 A | 6/2007 |
| CN | 101090491 A | 12/2007 |
| (Continued) | | |

OTHER PUBLICATIONS

Jung, el al.: "Description of Core Experiment CE1: Motion Data Storage reduction", XP055326996, JCTVC-E701, Joint Collaborative Team on Video Coding (JCT-VC) of ITU-T SG16 WP3 and ISO/IEC JTC1/SC29/WG11, 5th Meeting, Geneva, CH, Mar. 16-23, 2011.
(Continued)

*Primary Examiner* — Eileen M Adams
(74) *Attorney, Agent, or Firm* — Dentons US LLP

(57) ABSTRACT

A motion information storing method and a TMVP deriving method using the motion information storing method are provided. The motion information storing method includes a step of determining a representative block out of blocks of a motion data storage unit in a co-located picture with a current picture and a step of storing motion information of the representative block as motion information of the motion data storage unit, wherein the motion information of the representative block is used as motion information of the blocks included in the motion data storage unit.

17 Claims, 26 Drawing Sheets

Related U.S. Application Data continuation of application No. 15/629,405, filed on Jun. 21, 2017, now Pat. No. 9,832,482, which is a continuation of application No. 15/342,996, filed on Nov. 3, 2016, now Pat. No. 9,716,898, which is a continuation of application No. 14/830,403, filed on Aug. 19, 2015, now Pat. No. 9,521,426, which is a continuation of application No. 13/984,735, filed as application No. PCT/KR2012/000965 on Feb. 9, 2012, now Pat. No. 9,148,666.

(60) Provisional application No. 61/478,914, filed on Apr. 25, 2011, provisional application No. 61/478,055, filed on Apr. 21, 2011, provisional application No. 61/473,153, filed on Apr. 8, 2011, provisional application No. 61/451,124, filed on Mar. 10, 2011, provisional application No. 61/448,634, filed on Mar. 2, 2011, provisional application No. 61/445,539, filed on Feb. 23, 2011, provisional application No. 61/443,261, filed on Feb. 16, 2011, provisional application No. 61/440,872, filed on Feb. 9, 2011.

(51) Int. Cl.

| | | |
|---|---|---|
| *H04N 19/176* | (2014.01) | |
| *H04N 19/513* | (2014.01) | |
| *H04N 19/51* | (2014.01) | |
| *H04N 19/577* | (2014.01) | |
| *H04N 19/11* | (2014.01) | |
| *H04N 19/109* | (2014.01) | |

(52) U.S. Cl.
 CPC ............ *H04N 19/50* (2014.11); *H04N 19/51* (2014.11); *H04N 19/521* (2014.11); *H04N 19/577* (2014.11)

(56) References Cited

U.S. PATENT DOCUMENTS

| | | |
|---|---|---|
| 2006/0083311 A1 | 4/2006 | Winger |
| 2006/0227872 A1 | 10/2006 | Mori et al. |
| 2007/0110161 A1 | 5/2007 | Saigo et al. |
| 2008/0063066 A1 | 3/2008 | Jeon |
| 2008/0069223 A1 | 3/2008 | Jeon |
| 2008/0181309 A1 | 7/2008 | Lee et al. |
| 2008/0240238 A1 | 10/2008 | Yoshino et al. |
| 2009/0141798 A1 | 6/2009 | Adachi et al. |
| 2009/0245391 A1 | 10/2009 | Youn |
| 2010/0080297 A1 | 4/2010 | Wang et al. |
| 2010/0246683 A1 | 9/2010 | Webb et al. |
| 2010/0271494 A1 | 10/2010 | Miyasako |
| 2011/0026596 A1 | 2/2011 | Hong |

FOREIGN PATENT DOCUMENTS

| | | |
|---|---|---|
| CN | 101127913 A | 2/2008 |
| CN | 101827269 A | 9/2010 |
| JP | 2010-258710 A | 11/2010 |
| KR | 10-2008-0076870 A | 8/2008 |
| KR | 10-2009-0022377 A | 3/2009 |

OTHER PUBLICATIONS

Park, et al.: "Modifications of temporal mv compression and temporal mv predictor", XP030008565, Joint Collaborative Team on Video Coding (JCT-VC) of ITU-T SG16 WP3 and ISO/IEC JTC1/SC29/WG11, 5th Meeting, Geneva, CH, Mar. 16-23, 2011.
Jung et al., "Temporal MV predictor modification for MV-Comp, Skip, Direct and Merge schemes", Jan. 2011, pp. 1-5.
Jian-Liang Lin; "Improved Advanced Motion Vector Predicition", Jan. 2011, pp. 1-8.
International Search Report dated Sep. 24, 2012 from International Application No. PCT/KR2012/000965 including English translation, 4 pages.
U.S. Appl. No. 15/804,588, filed Nov. 6, 2017.
U.S. Appl. No. 15/629,405, filed Jun. 21, 2017, now U.S. Pat. No. 9,716,898, dated Jul. 25, 2017.
U.S. Appl. No. 14/830,403, filed Aug. 19, 2015, now U.S. Pat. No. 9,521,426, dated Dec. 13, 2016.
U.S. Appl. No. 13/984,735, filed Aug. 9, 2013, now U.S. Pat. No. 9,148,666, dated Sep. 29, 2015.

FIG. 7

| (X0,Y0) | (X1,Y1) | (X2,Y2) | (X3,Y3) |
|---|---|---|---|
| B0 | B1 | B2 | B3 |
| (X4,Y4) | (X5,Y5) | (X6,Y6) | (X7,Y7) |
| B4 | B5 | B6 | B7 |
| (X8,Y8) | (X9,Y9) | (X10,Y10) | (X11,Y11) |
| B8 | B9 | B10 | B11 |
| (X12,Y12) | (X13,Y13) | (X14,Y14) | (X15,Y15) |
| B12 | B13 | B14 | B15 |

| (X0,Y0) | (X1,Y1) | (X2,Y2) | (X3,Y3) |
|---|---|---|---|
| B0 | B1 | B2 | B3 |
| (X4,Y4) | (X5,Y5) | (X6,Y6) | (X7,Y7) |
| B4 | B5 | B6 | B7 |
| (X8,Y8) | (X9,Y9) | (X10,Y10) | (X11,Y11) |
| B8 | B9 | B10 | B11 |
| (X12,Y12) | (X13,Y13) | (X14,Y14) | (X15,Y15) |
| B12 | B13 | B14 | B15 |

| | | | |
|---|---|---|---|
| (X0,Y0) ref_idx 2 | (X1,Y1) ref_idx 1 | (X2,Y2) ref_idx 0 | (X3,Y3) ref_idx 0 |
| B0 | B1 | B2 | B3 |
| (X4,Y4) ref_idx 2 | (X5,Y5) ref_idx 1 | (X6,Y6) ref_idx 0 | (X7,Y7) ref_idx 0 |
| B4 | B5 | B6 | B7 |
| (X8,Y8) ref_idx 2 | (X9,Y9) ref_idx 0 | (X10,Y10) ref_idx 1 | (X11,Y11) ref_idx 1 |
| B8 | B9 | B10 | B11 |
| (X12,Y12) ref_idx 2 | (X13,Y13) ref_idx 0 | (X14,Y14) ref_idx 1 | (X15,Y15) ref_idx 1 |
| B12 | B13 | B14 | B15 |

1200

↓ MOTION VECTOR MEMORY COMPRESSION

| | | | |
|---|---|---|---|
| (X0,Y0) ref_idx 2 | (X0,Y0) ref_idx 2 | (X0,Y0) ref_idx 2 | (X0,Y0) ref_idx 2 |
| B0 | B1 | B2 | B3 |
| (X0,Y0) ref_idx 2 | (X0,Y0) ref_idx 2 | (X0,Y0) ref_idx 2 | (X0,Y0) ref_idx 2 |
| B4 | B5 | B6 | B7 |
| (X0,Y0) ref_idx 2 | (X0,Y0) ref_idx 2 | (X0,Y0) ref_idx 2 | (X0,Y0) ref_idx 2 |
| B8 | B9 | B10 | B11 |
| (X0,Y0) ref_idx 2 | (X0,Y0) ref_idx 2 | (X0,Y0) ref_idx 2 | (X0,Y0) ref_idx 2 |
| B12 | B13 | B14 | B15 |

1210

METHOD FOR STORING MOTION INFORMATION AND METHOD FOR INDUCING TEMPORAL MOTION VECTOR PREDICTOR USING SAME

This application is a continuation application of U.S. application Ser. No. 15/804,588, filed Nov. 6, 2017, which is a continuation of U.S. patent application Ser. No. 15/629,405, filed Jun. 21, 2017, now U.S. Pat. No. 9,832,482, issued Nov. 28, 2017, which is a continuation of U.S. patent application Ser. No. 15/342,996, filed Nov. 3, 2016, now U.S. Pat. No. 9,716,898, issued Jul. 25, 2017, which is a continuation of U.S. application Ser. No. 14/830,403, filed Aug. 19, 2015, now U.S. Pat. No. 9,521,426, issued Dec. 13, 2016, which is a continuation of U.S. application Ser. No. 13/984,735, filed Aug. 9, 2013, now U.S. Pat. No. 9,148,666, issued Sep. 29, 2015, which is a National Stage Entry of International Application No. PCT/KR2012/000965, filed Feb. 9, 2012, which claims priority to and benefit of U.S. Provisional Application Nos. 61/478,914 filed Apr. 25, 2011, 61/478,055 filed Apr. 21, 2011, 61/473,153 filed Apr. 8, 2011, 61/451,124 filed Mar. 10, 2011, 61/448,634 filed Mar. 2, 2011, 61/445,539 filed Feb. 23, 2011, 61/443,261 filed Feb. 16, 2011, and 61/440,872 filed Feb. 9, 2011, all of which are incorporated herein by reference in its entirety.

TECHNICAL FIELD

The present invention relates to a video data compressing technique, and more particularly, to a method of deriving a temporal motion vector predictor in inter prediction and a method of storing information necessary for deriving the temporal motion vector predictor.

BACKGROUND ART

Recently, demands for a high-resolution and high-quality image have increased in various fields of applications. As an image has higher resolution and higher quality, an amount of data on the image increases more. Accordingly, when image data is transferred using media such as existing wired or wireless broadband lines or image data is stored in existing storage media, the transfer cost and the storage cost increases. In order to effectively transfer, store, and reproduce information on high-resolution and high-quality images, high-efficiency image compressing techniques may be utilized.

Inter prediction and intra prediction may be used to enhance image compression efficiency.

In the inter prediction, pixel values included in a current picture are predicted from previous or subsequent pictures of the current picture. In the intra prediction, pixel values included in a current picture are predicted using pixel information in the current picture.

In addition to the inter prediction and the intra prediction, a weighting value predicting technique for preventing degradation in image quality due to a variation in illumination or the like, an entropy encoding technique of assigning a short code to a symbol with a high appearance frequency and assigning a long code to a symbol with a low appearance frequency, and the like may be used for more efficient processes.

SUMMARY OF THE INVENTION

Technical Problem

A technical object of the invention is to provide a method and a device for performing an effective prediction.

Another technical object of the invention is to provide a method and a device which may prevent a distortion and enhance compression efficiency in deriving a temporal motion vector predictor in an inter prediction.

Another technical object of the invention is to provide a method and a device which may reduce memory capacity in storing information for deriving a temporal motion vector predictor.

Another technical object of the invention is to provide a method and a device which may reduce a computational load and reduce complexity in storing information for deriving a temporal motion vector predictor.

Solution to Problem (1) According to an aspect of the invention, there is provided a motion information storing method including the steps of: determining a representative block out of blocks of a motion data storage unit in a co-located picture with a current picture; and storing motion information of the representative block as motion information of the motion data storage unit, wherein the motion information of the representative block is used as motion information of the blocks included in the motion data storage unit.

(2) In (1), the motion information of the representative block may include a motion vector and a reference index, and the motion vector and the reference index of the representative block may be used as motion vectors and reference indices of the blocks included in the motion data storage unit.

(3) In (2), it may be indicated that the blocks encoded in an intra prediction mode out of the blocks included in the motion data storage unit are intra blocks.

(4) In (3), a reference index indicating that a block is an intra block, instead of the reference index of the representative block, may be assigned to the blocks encoded in an intra prediction mode out of the blocks included in the motion data storage unit.

(5) In (3), it may be indicated using a prediction type of a coding block that the blocks encoded in an intra prediction mode out of the blocks included in the motion data storage unit are intra blocks.

(6) In (1), the motion information of the representative block may include a motion vector, a reference index, and a prediction mode, and the motion vector, the reference index, and the prediction mode of the representative block may be used as motion vectors, reference indices, and prediction modes of the blocks included in the motion data storage unit.

(7) In (1), the motion information of the representative block may include a motion vector, a reference index, and a prediction mode, the motion vector, the reference index, and the prediction mode of the representative block may be used as motion vectors, reference indices, and prediction modes of the blocks included in the motion data storage unit, and it may be indicated that the blocks encoded in an intra prediction mode out of the blocks included in the motion data storage unit are intra blocks.

(8) In (1), the representative block may be a top-left block out of the blocks included in the motion data storage unit.

(9) In (1), the representative block may be an inter block first searched for when the blocks included in the motion data storage unit are searched in a predetermined search order.

(10) In (9), the search order may be a raster scan order which is started from a top-left block in the motion data storage unit.

(11) In (9), the search order may be an order which proceeds in a spiral direction from a center block in the motion data storage unit.

(12) In (1), the representative block may be a block of which the reference index has a value of 0 and which is an inter block first searched for when the blocks included in the motion data storage unit are searched in a predetermined search order.

(13) In (1), when all the blocks included in the motion data storage unit are encoded in an intra prediction mode, a block encoded in an intra prediction mode out of blocks adjacent to the motion data storage unit may be selected as the representative block.

(14) In (1), the representative block may be a block located at the right-bottom corner out of four blocks located at the center of the motion data storage unit.

(15) In (1), the representative block may be a block adjacent to the right-bottom corner of the motion data storage unit out of blocks adjacent to the motion data storage unit.

(16) In (1), the size of the motion data storage unit may be determined by an encoder and is signaled to a decoder.

(17) In (1), when the size of a boundary motion data storage unit located at a picture boundary is smaller than an internal motion data storage unit located inside the picture and a block co-located with a representative block of the internal motion data storage unit is not available as a representative block of the boundary motion data storage unit, a block located at the top-left corner out of blocks included in the boundary motion data storage unit may be determined as the representative block of the boundary motion data storage unit.

(18) According to another aspect of the invention, there is provided a temporal motion vector predictor deriving method including the steps of: determining a co-located picture of a current picture; determining a co-located prediction unit of a current block in the co-located picture; and setting motion information of the co-located prediction unit as a temporal motion vector predictor of the current block, wherein the co-located prediction unit is a prediction unit located at the top-left corner in a motion data storage unit including a positioning pixel for the co-located prediction unit, and the positioning pixel is a pixel adjacent to the right-bottom corner of the co-located block of the current block in the co-located picture.

(19) In (18), when the pixel adjacent to the right-bottom corner of the co-located block is a pixel which is not available for an inter prediction, a pixel at the right-bottom pixel out of four pixels located at the center of the co-located block may be selected as the positioning pixel.

(20) In (18), the co-located prediction unit may be any one of a prediction unit located at the center of the motion data storage unit and a prediction unit adjacent to the right-bottom corner of the motion data storage unit.

Advantageous Effect of the Invention

According to the aspects of the invention, it is possible to enhance prediction efficiency in a process of compressing image data and to improve encoding/decoding performance.

According to the aspects of the invention, it is possible to prevent a distortion and to enhance compression efficiency in deriving a temporal motion vector predictor for an inter prediction.

According to the aspects of the invention, it is possible to reduce memory capacity in storing information for deriving a temporal motion vector predictor.

According to the aspects of the invention, it is possible to reduce a computational load and to reduce complexity in storing information for deriving a temporal motion vector predictor.

BRIEF DESCRIPTION OF THE DRAWINGS

FIG. 7 is a diagram schematically illustrating a method of storing motion information.

FIG. 9 is a diagram schematically illustrating motion information of motion data blocks when 4×4 motion data blocks are set as a single motion data storage unit in a system to which the invention is applied.

FIG. 10 is a diagram schematically illustrating an order for searching for a prediction mode in which motion data blocks in a motion data storage unit are coded according to the invention.

FIG. 12 is a diagram schematically illustrating a state in which motion information memory compression is performed on a reference index as well as a motion vector when performing motion vector memory compression.

DESCRIPTION OF EXEMPLARY EMBODIMENTS

Figure 1:
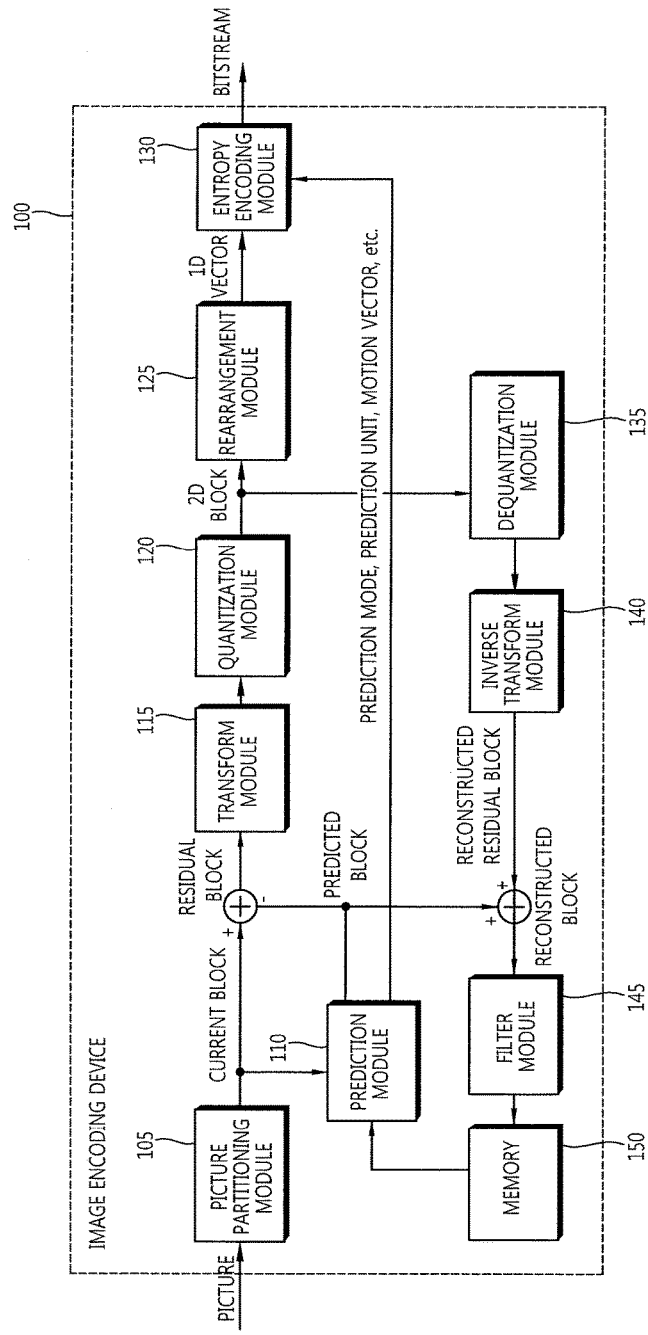
FIG. 1 is a block diagram schematically illustrating an image encoding device (encoder) according to an embodiment of the invention.

The present invention may be variously modified in various forms, and specific embodiments thereof will be described and shown in the drawings. However, the embodiments are not intended for limiting the invention. The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating an image encoding device (encoder) according to an embodiment of the invention. Referring to FIG. 1, an image encoding device 100 includes a picture partitioning module 105, a prediction module 110, a transform module 115, a quantization module 120, a rearrangement module 125, an entropy encoding module 130, a dequantization module 135, an inverse transform module 140, a filter module 145, and a memory 150.

The picture partitioning module 105 may partition an input picture into at least one process unit. Here, the process unit may be a prediction unit (hereinafter, referred to as a "PU"), a transform unit (hereinafter, referred to as a "TU"), or a coding unit (hereinafter, referred to as a "CU"). In this specification, for the purpose of convenience for explanation, a prediction unit may be expressed by a prediction block, a transform unit may be expressed by a transform block, and a coding unit may be expressed by a coding block.

The prediction module 110 includes an inter prediction module that performs an inter prediction process and an intra prediction module that performs an intra prediction process, as described later. The prediction module 110 performs a prediction process on the process units of a picture divided by the picture partitioning module 105 to create a prediction block. In the prediction module 110, the process unit of a picture may be a CU, a TU, or a PU. It may be determined whether the prediction performed on the corresponding process unit is an inter prediction or an intra prediction, and specific details (for example, a prediction mode) of the prediction methods may be determined. The process unit subjected to the prediction process may be different from the process unit of which the prediction method and the specific details are determined. For example, the prediction method and the prediction mode may be determined by the PU units and the prediction process may be performed by the TU units.

In the inter prediction, a prediction process is performed on the basis of information on at least one of a previous picture and/or a subsequent picture of a current picture to create a prediction block. In the intra prediction, a prediction process is performed on the basis of pixel information of a current picture to create a prediction block.

In the inter prediction, a reference picture is selected for a PU, and a reference block having the same size as the PU may be selected by integer pixel samples. Then, a prediction block in which a residual signal with the current PU is minimized and the motion vector magnitude is minimized is created. On the other hand, a skip mode, a merge mode, an MVP (Motion Vector Prediction), or the like may be used as the intra prediction method. The prediction block may be created in the unit of pixel samples less than an integer pixel such as ½ pixel samples and ¼ pixel samples. Here, the motion vector may also be expressed in the unit of pixel samples less than an integer pixel. For example, luma pixels may be expressed in the unit of ¼ pixels and chroma pixels may be expressed in the unit of ⅛ pixels.

Information such as an index, a motion vector (for example, a motion vector predictor), and a residual signal of a reference picture selected through the inter prediction is entropy-encoded and is transmitted to a decoder.

When the intra prediction is performed, the prediction mode may be determined in the unit of PU and the prediction process may be performed in the unit of PU. The prediction mode may be determined in the unit of PU and the inter prediction may be performed in the unit of TU.

The prediction modes in the intra prediction include 33 directional prediction modes and at least two non-directional modes. The non-directional modes include a DC prediction mode and a planar mode.

In the intra prediction, a prediction block may be produced after a filter is applied to a reference sample. At this time, it may be determined whether a filter should be applied to a reference sample depending on the intra prediction mode and/or the size of a current block. The current block may be a transform unit to be subjected to a prediction process. On the other hand, use of a pixel in this specification means that information the pixel such as a pixel value is used. For the purpose of convenience for explanation, it should be noted that an expression "information of a pixel is used" or "a pixel value is used" may be simply expressed by "a pixel is used". The specific intra prediction method is as described later.

A PU has various sizes and shapes. For example, in case of inter prediction, a PU may have sizes such as 2N×2N, 2N×N, N×2N, and N×N. In case of intra prediction, a PU may have sizes such as 2N×2N and N×N (where N is an integer). The PU with a size of N×N may be set to be applied to only a specific case. For example, the PU with a size of N×N may be set to be used for only a smallest coding unit or may be set to be used for only intra prediction. In addition to the Pus with the above-mentioned sizes, Pus having sizes such as N×mN, mN×N, 2N×mN, and mN×2N (where m<1) may be additionally defined and used.

Residual values (a residual block or a residual signal) between the produced prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TU and outputs transform coefficients. The transform unit in the transform module 115 may be a TU and may have a quad tree structure. The size of the transform unit may be determined within a predetermined largest and smallest size range. The transform module 115 may transform the residual block using DCT (Discrete Cosine Transform) and/or DST (Discrete Sine Transform).

The quantization module 120 may quantize the residual values transformed by the transform module 115 and may output quantization coefficients. The values calculated by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the encoding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the order of coefficient scanning on the basis of stochastic statistics of the coefficients transmitted from the quantization module.

The entropy encoding module 130 performs an entropy encoding process on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 may encode a variety of information such as residual coefficient information and block type information of a coding unit, prediction mode information, dividing unit information, prediction unit information, transfer unit information, motion vector information, reference picture information, block interpolation information, and filtering information transmitted from the rearrangement module 125 and the prediction module 110.

The entropy encoding module 130 may give a predetermined change to a parameter set or syntax to be transmitted, if necessary.

The dequantization module 135 dequantizes the values quantized by the quantization module 120. The inverse transform module 140 inversely transforms the values dequantized by the dequantization module 135. The residual values generated by the dequantization module 135 and the inverse transform module 140 are merged with the prediction block predicted by the prediction module 110 to create a reconstructed block.

The filter module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter module 145 may not perform a filtering process on a reconstructed block used for the inter prediction.

The memory 150 stores the reconstructed block or picture calculated by the filter module 145. The reconstructed block or picture stored in the memory 150 is supplied to the prediction module 110 when performing the inter prediction.

Figure 2:
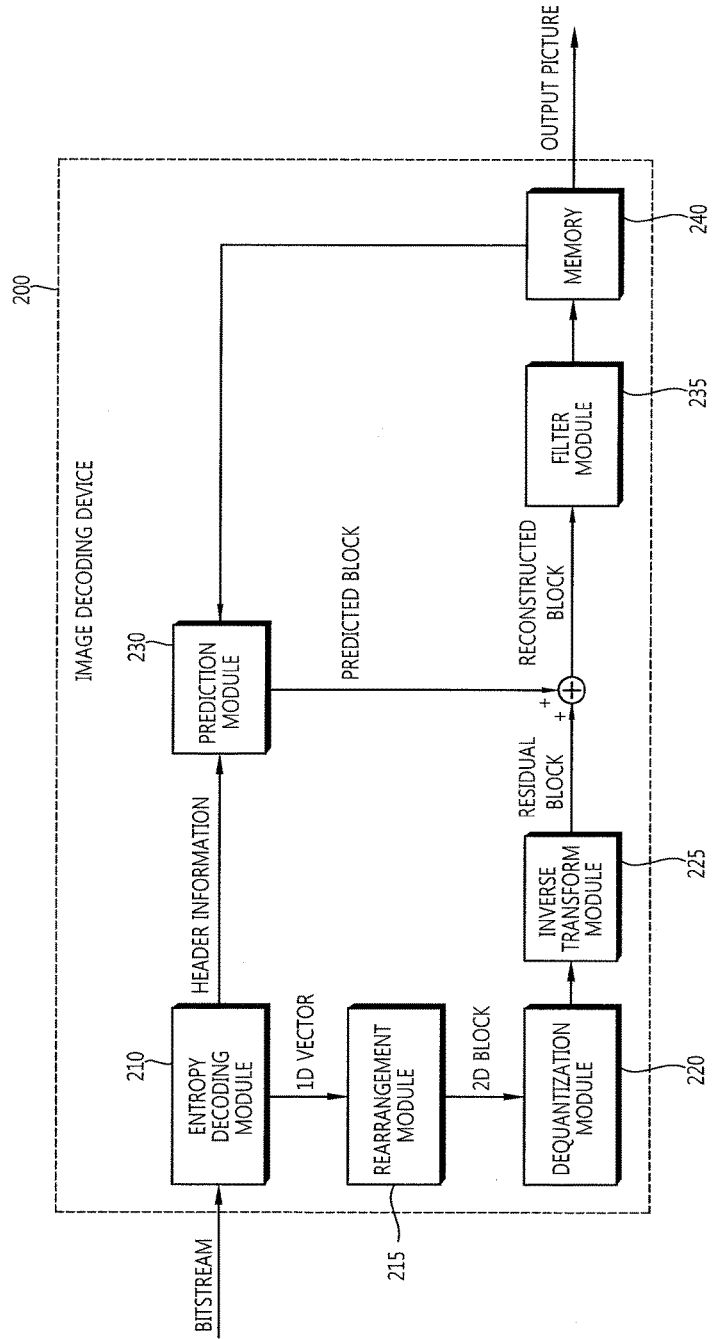
FIG. 2 is a block diagram schematically illustrating an image decoding device according to an embodiment of the invention.

FIG. 2 is a block diagram schematically illustrating an image decoding device according to an embodiment of the invention. Referring to FIG. 2, an image decoding device 200 includes an entropy decoding module 210, a rearrangement module 215, a dequantization module 220, an inverse transform module 225, a prediction module 230, a filter module 235, and a memory 240.

When an image bitstream is input from the image encoding device, the input bitstream is decoded on the basis of the order in which image information is processed by the image encoding device.

For example, when the image encoding device uses a variable length coding (hereinafter, referred to as "VLC") method such as the CAVLC to perform the entropy encoding process, the image decoding module 210 may realize the same VLC table as used in the image encoding device and may perform the entropy decoding process. When the image encoding device uses the CABAC to perform the entropy encoding process, the entropy decoding module 210 may perform the entropy decoding process using the CABAC to correspond thereto.

Information for creating a prediction block out of the information decoded by the entropy decoding module 210 is supplied to the prediction module 230, and the residual values entropy-decoded by the entropy decoding module are input to the rearrangement module 215.

The rearrangement module 215 rearranges the bitstream entropy-decoded by the entropy decoding module 210 on the basis of the rearrangement method in the image encoding device. The rearrangement module 215 reconstructs and rearranges coefficients expressed in the form of one-dimensional vector into coefficients of a two-dimensional block form. The rearrangement module 215 is supplied with information associated with the coefficient scanning performed by the encoding module and may perform the rearrangement using a method of inversely scanning the coefficients on the basis of the scanning order in which the scanning is performed by the corresponding encoding module.

The dequantization module 220 performs dequantization on the basis of the quantization parameters supplied from the encoder and the rearranged coefficient values of the block.

The inverse transform module 225 performs the inverse DCT and inverse DST of the DCT and DST, which has been performed by the transform module of the image encoding device, on the quantization result from the image encoding device. The inverse transform is performed on the basis of a transfer unit or a division unit of a picture determined by the image encoding device. The transform module of the image encoding device selectively performs the DCT and DST depending on plural information elements such as the prediction method, the size of the current block, and the prediction direction, and the inverse transform module 225 of the image decoding device performs the inverse transform on the basis of the transform information on the transform performed by the transform module of the image encoding device.

The prediction module 230 creates a prediction block on the basis of prediction block creation information supplied from the entropy decoding module 210 and the previously-decoded block and/or picture information supplied from the memory 240. The reconstructed block may be derived using the prediction block generated by the prediction module 230 and the residual block supplied from the inverse transform module 225. When the prediction mode of a current PU is an intra prediction mode (intra mode), an intra prediction process of creating a prediction block on the basis of pixel information in the current picture may be performed.

When the prediction mode of a current PU is an inter prediction mode (inter mode), an inter prediction process may be performed on the current PU on the basis of information included in at least one of a previous picture or a subsequent picture of the current picture. At this time, motion information necessary for the inter prediction of the current PU supplied from the image encoding device, for example, information on motion vectors, reference picture indices, and the like, may be derived from a skip flag, a merge flag, and the like received from the encoder.

The reconstructed block and/or picture are supplied to the filter module 235. The filter module 235 performs a deblocking filtering process, an SAO (Sample Adaptive Offset) process, and/or an adaptive loop filtering process on the reconstructed block and/or picture.

The memory 240 stores the reconstructed picture or block for use as a reference picture or a reference block and supplies the reconstructed picture to the output module.

In case of the inter prediction mode, the decoder and the encoder derive the motion information of a current block and perform the inter prediction on the current block on the basis of the derived motion information.

Figure 3:
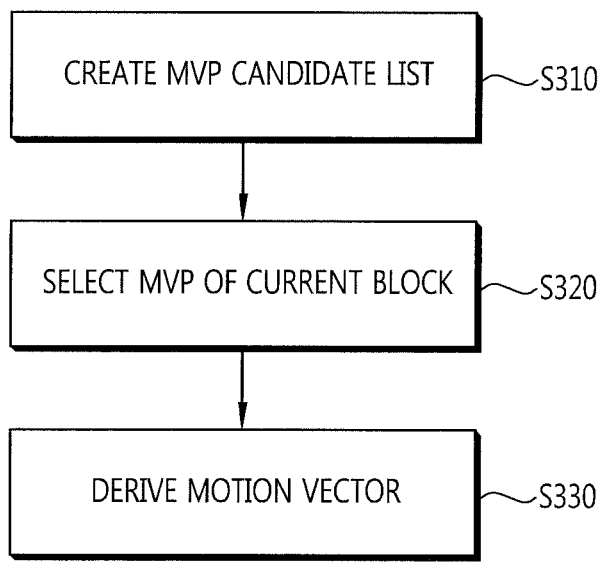
FIG. 3 is a flowchart schematically illustrating an example of a method of deriving a motion vector when an AMVP is applied to an inter prediction mode.

FIG. 3 is a flowchart schematically illustrating an example of a method of deriving a motion vector when an AMVP (Advanced Motion Vector Predictor) is applied to the inter prediction mode.

Referring to FIG. 3, the encoder and the decoder may derive a motion vector predictor (hereinafter, referred to as "MVP") candidate list of a current block (S310). The MVP represents a predicted value of a motion vector of the current block.

The encoder and the decoder may generate an MVP candidate list using motion vectors of available neighbouring blocks adjacent to the current block and/or available blocks (hereinafter, referred to as "Col block" (co-located block) for the purpose of convenience for explanation) out of blocks of reference pictures co-located with the current block.

A specific method of creating the MVP candidate list will be described later.

In this specification, a block adjacent to a current block is defined as a "neighbouring block" for the purpose of convenience for explanation.

The encoder and the decoder may select the MVP of the current block out of the MVP candidates included in the MVP candidate list.

The encoder may select the optimal MVP of the current block by applying motion vector competition (MVC) on the MVP candidates included in the MVP candidate list. When an MVP is selected, the encoder transfers an MVP index to the decoder using a bitstream. The MVP index is an index indicating the MVP of the current block and is selected from the MVP candidates included in the MVP candidate list.

The decoder receives the MVP index from the encoder. The decoder selects the MVP of the current block out of the MVP candidates included in the MVP candidate list using the received MVP index.

The decoder may derive a motion vector of the current block using the selected MVP (S330).

When the MVP of the current block is selected, the encoder calculates a difference between the motion vector of the current block and the MVP. The difference between the motion vector and the MVP is referred to as a motion vector difference (hereinafter, referred to as "MVD").

The encoder may transfer information on the MVD instead of the motion vector to the decoder. In this case, as the MVD becomes smaller, the amount of information transferred from the encoder to the decoder may become smaller.

The decoder receives the information on the MVD from the encoder. When the MVP is selected of the current block is selected, the decoder adds the MVD to the selected MVP to calculate the motion vector of the current block.

Figure 4:
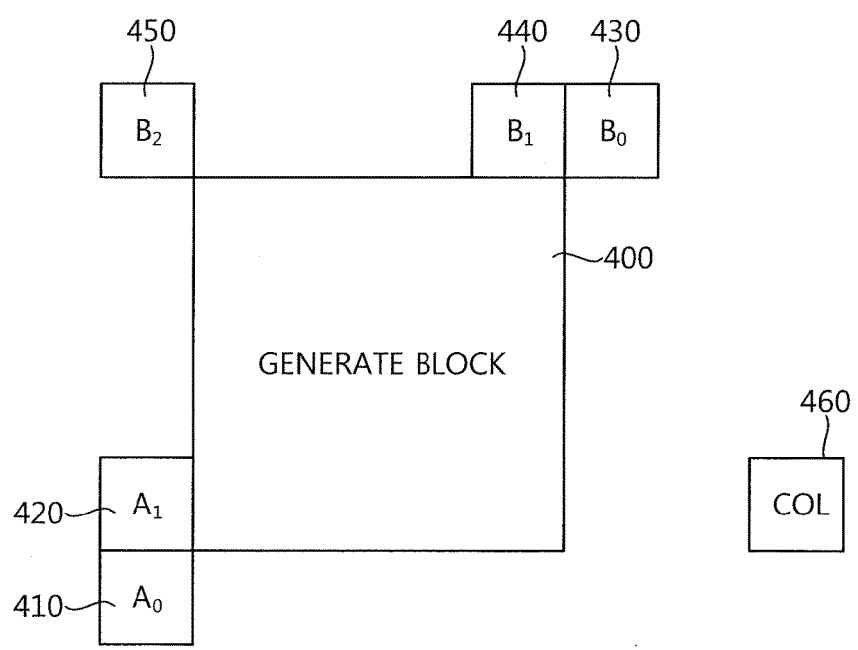
FIG. 4 is a conceptual diagram schematically illustrating an example of a method of creating an MVP candidate list.

FIG. 4 is a conceptual diagram schematically illustrating an example of a method of creating an MVP candidate list.

In this specification, for the purpose of convenience for explanation, a candidate group including a left-bottom neighbouring block $A_0$ 410 which is a neighbouring block at the left-bottom corner of a current block 400 and a left block $A_1$ 420 which is located at the bottom out of the left neighbouring blocks of the current block 400 is defined as a left candidate group. A candidate group including a top-right neighbouring block $B_0$ 430 which is a neighbouring block at the top-right corner of the current block 400, a right neighbouring block $B_1$ 440 which is located on the rightmost side out of the top neighbouring blocks of the current block 400, and a top-left block $B_2$ 450 which is a neighbouring block at the top-left corner of the current block 400 is defined as a top candidate group.

The encoder and the decoder selects one MVP candidate from the left candidate group ($A_0$ and $A_1$). The MVP candidate selected from the left candidate group is defined as $MV_A$. For example, the encoder and the decoder may select the motion vector of the first block, which has the same reference picture index as the current block and which is available, as the MVP candidate $MV_A$ of the current block while scanning the blocks included in the left candidate block in the order of $A_0 \rightarrow A_1$.

The encoder and the decoder also may select one MVP candidate from the top candidate group ($B_0$, $B_1$, and $B_2$). The MVP candidate selected from the top candidate group is defined as $MV_B$. For example, the encoder and the decoder select the motion vector of the first block, which has the same reference picture index as the current block and which is available, as the MVP candidate $MV_B$ of the current block while scanning the blocks included in the top candidate group in the order of $B_0 \rightarrow B_1 \rightarrow B_2$.

The encoder and the decoder may select the motion vector of a Col block COL 460 in a reference picture as the MVP candidate of the current block. Here, the motion vector of the Col block 660 is expressed by mvCol.

In the above-mentioned embodiment, the MVP candidate selected from the left candidate group and the MVP candidate selected from the top candidate are referred to as spatial motion vector predictor (hereinafter, referred to as "SMVP"). The MVP candidate selected using the Col block in the reference picture is referred to as a temporal motion vector predictor (hereinafter, referred to as "TMVP"). Therefore, the MVP candidate list includes the SMVP and/or the TMVP.

When there are overlapping candidates out of the MVP candidates selected by the above-mentioned method, the encoder and the decoder may remove the other candidates other than the highest-ranked candidate out of the overlapping candidates.

As described above, the TMVP as well as the SMVP is used for the inter prediction of the current block.

Figure 5:
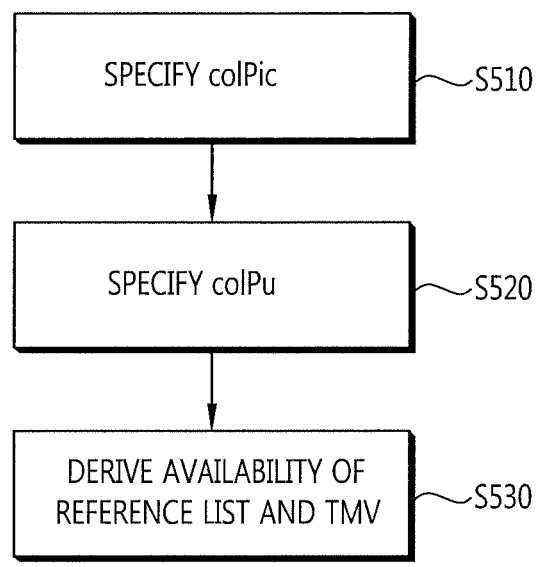
FIG. 5 is a flowchart schematically illustrating an example of a method of deriving a TMVP for an inter prediction in the imaging decoding device.

FIG. 5 is a flowchart schematically illustrating an example of a method of deriving a TMVP for an inter prediction in a decoder. The operations of the decoder is illustrated in FIG. 5 for the purpose of convenience for explanation, but an encoder also performs the same operations as the decoder to perform an inter prediction using the same TMVP candidate as in the decoder. Therefore, the operations of the decoder described with reference to FIG. 5 may be similarly applied to the decoder.

Referring to FIG. 5, the decoder first specifies a co-located picture (hereinafter, referred to as "colPic") including a col block (co-located block) or a col partition (co-located partition) (S510).

The decoder may specify the colPic on the basis of information on a slice type and information on from what reference picture list the colPic is selected.

For example, when the slice type of a current block is B and a reference picture is not selected from L0, the colPic is specified from L1.

Pictures used for encoding and decoding an image may be classified into an I picture, a P picture, and a B picture.

The I picture is a picture which is independently encoded using its own picture regardless of the previous and subsequent pictures thereof. Temporal prediction is not applied to the I picture and only intra information is used for the encoding thereof. The P picture is a picture which may be encoded by unidirectional inter prediction using a single reference picture. The P picture requires one reference picture list, which is called reference picture list 0 (L0). The inter prediction using a reference picture selected from L0 is also called L0 prediction. The L0 prediction is used mainly for forward prediction. The intra prediction or the L0 prediction may be performed for the P picture.

The B picture is a picture which may be encoded through forward, backward, or bidirectional inter prediction using two reference pictures. The B picture requires two reference picture lists, which are called reference picture list 0 (L0) and reference picture list 1 (L1). As described above, the inter prediction using a reference picture selected from L0 is called L0 prediction. The L0 prediction is used mainly for forward prediction. The inter prediction using a reference picture selected from L1 is called L1 prediction. The L1 prediction is used mainly for backward prediction. The inter prediction using two reference pictures selected from L0 and L1 is called bi prediction.

The intra prediction, the L0 prediction, the L1 prediction, or the bi prediction may be performed for the B picture. Two pieces of motion information may be used for the B picture. Therefore, the forward prediction may be performed for the B picture using two previous reference pictures, the backward prediction may be performed using two subsequent reference pictures, and the bi prediction may be performed using one previous reference picture and one subsequent reference picture. The B picture on which the bi prediction may be performed requires two reference picture lists of L0 and L1.

The features of the I picture, the P picture, and the B picture may be defined in the unit of slices, not in the unit of pictures. For example, an I slice having the feature of the I picture in the unit of slices, a P slice having the feature of the P picture, and a B slice having the feature of the B picture may be defined.

When the slice type of a current block is B and the colPic is selected from L0, or when the slice type of a current block is P, the colPic may be selected from L0.

The decoder may specify a co-located prediction block colPu to be used for prediction of a current block from the selected colPic (S520). The decoder may use information of the colPu specified in the colPic as the TMVP in inter prediction of a current block.

Figure 6:
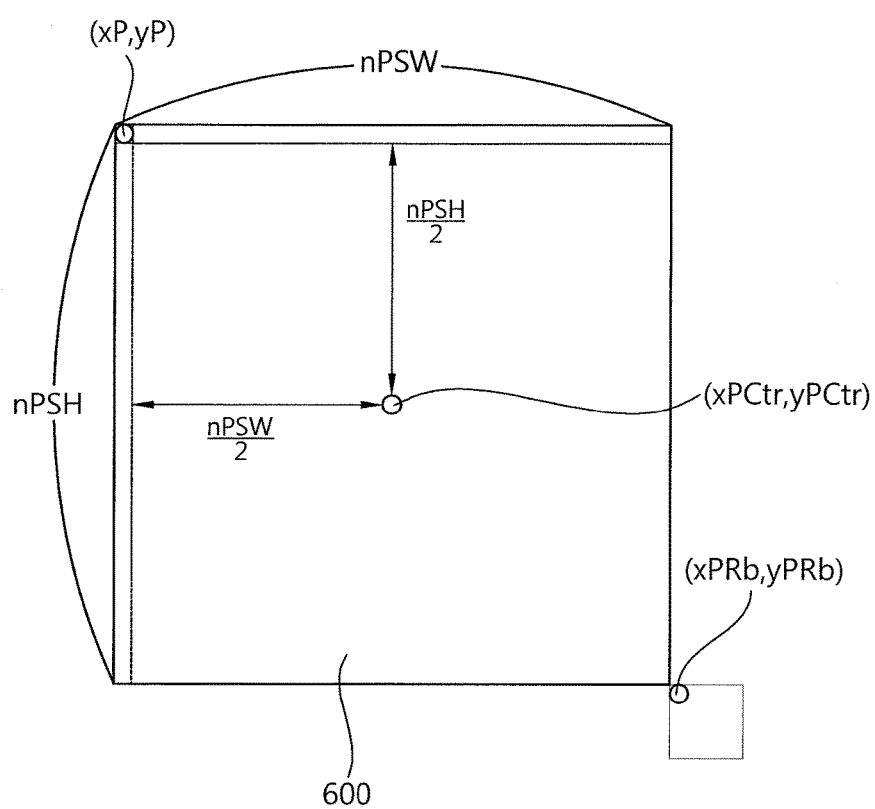
FIG. 6 is a diagram schematically illustrating a method of specifying a colPU.

FIG. 6 is a diagram schematically illustrating a method of specifying a colpu. Referring to FIG. 6, the position of a pixel sample $S_{TL}$ located at the top-left corner of a col block 600, corresponding to a current block, in a colPic (not shown) is specified as (xP, yP). Here, the current block and the col block may be a PU.

When the width of the current block is defined as nPSW and the height of the current block is defined as nPSH, the position of a pixel sample $S_{RB}$ located at the right-bottom corner of the col block 600 is specified as (xPRb, yPRb). Therefore, the size of the current block (col block) is specified by $S_{RB}$. $S_{RB}$ serves as a positioning pixel as described later.

When $S_{TL}$ and $S_{RB}$ belong to the same LCU (the largest CU), a prediction block covering the top-left corner of a predetermined motion data storage unit to which $S_{RB}$ belongs in the colPic is specified as a colPu (co-located prediction unit). For example, $S_{RB}$ serves as a pixel for positioning the position of the colPu.

The motion data storage unit is a unit for storing motion information used for prediction in the inter prediction. A block with a predetermined size may be set as a motion data storage unit and one piece of motion information may be stored for each motion data storage unit. For example, when one value is designated and stored for every N×N samples (where N is an integer) in a colPic and motion information of a specific block in the colPic is used for the inter prediction, motion information of the motion data storage unit covering the specific block may be used. The motion data storage unit may be set as a sample block having a specific size such as 4×4 samples, 6×6 samples, 8×8 samples, 12×12 samples, 16×16 samples, 32×32 samples, and 64×64 samples. The motion information may be stored in the unit of sample block having the set size.

For example, when the motion data storage unit is a 16×16 sample block, the position of ((xPRb>>4)<<4, (yPRb>>4)<<4) may be specified as the position of the colPu covering the top-left corner of the motion data storage unit to which $S_{RB}$ belongs.

When $S_{TL}$ and $S_{RB}$ do not belong to the same LCU, the colPu may be specified on the basis of a sample $S_{CTR}$ located at the center (specifically, at the center right-bottom corner specified by ½ of the col block size) of the col block. Therefore, $S_{CTR}$ also serves as a positioning pixel for positioning the colPu. The position (xPCtr, yPCtr) of the $S_{CTR}$ may be specified as (xP+(nPSW>>1), yP+(nPSH>>1)). In this case, the prediction block covering the top left corner of the motion data storage unit to which $S_{CTR}$ belongs may be specified as the colPu.

In this case, when the motion data storage unit is a 16×16 sample block, the position ((xPCtr>>4)<<4, (yCtr>>4)<<4) may be specified as the position of the colPu.

On the other hand, the position (xPCol, yPCol) of the colPu in the colPic may be specified as the position of the top-left sample of the colPu with respect to the position of the top-left sample of the colPic.

The decoder may derive information on a temporal motion vector and availability of a reference list to be used for prediction of a current block on the basis of information of the colPu (S530).

For example, when the colPu is coded in an intra prediction mode, when the colPu is unavailable, and when the colPic is set so as not to be used for the TMVP (Temporal Motion Vector Predictor), the temporal motion vector mvCol may be set to 0 and the reference list may be set to be unavailable.

At this time, availableFlagLXCol (where X is 0 or 1) may be used as information indicating the availability of the reference list. It is determined that the reference picture list is available when the value of availableFlagLXCol is 0, and it is determined that the reference picture list is unavailable when the value of availableFlagLXCol is 1.

Except when the colPu is not coded in an intra prediction mode, when the colPu is unavailable, and when the colPic is set so as not to be used for the TMVP (Temporal Motion Vector Predictor), that is, when the reference picture list is available, the temporal motion vector mvCol, the reference list refidxCol, and the reference list identifier listCol as the motion information may be derived as follows.

When the utilization of L0 for the colPu is determined and it is determined that L0 is not utilized, the value of temporal motion vector mvCol and the value of reference index refIdxCol may be specified using L1 as a reference list and using data of the colPu. For example, the value of temporal motion vector mvCol may be set to MvL1[xPCol][yPCol] and the value of reference index refIdxCol may be set to refIdxL1[xPCol][yPCol].

When the utilization of L0 is determined and it is determined that L0 is utilized but L1 is not utilized, the value of the temporal motion vector mvCol and the value of the reference index refIdxCol may be specified using L0 as a reference list and using data of the colPu. For example, the value of temporal motion vector mvCol may be set to MvL0[xPCol][yPCol] and the value of reference index refIdxCol may be set to refIdxL0[xPCol][yPCol].

When it is determined that both of L0 and L1 are utilized, temporal motion information may be determined by comparing a picture order count of a current picture with a picture order count of pictures in each reference picture list. For example, when the picture order count of the current picture is equal to or larger than the picture order count of the pictures in the reference picture lists, the motion vector and the reference index indicated by the position (xPCol, yPCol) of the colPu in the reference picture list used to derive the temporal motion information may be set as the values of mvCol and refIdxCol, respectively.

When the picture order count of at least one picture in the reference picture lists is larger than the picture order count of the current picture, the motion vector and the reference index indicated by the position (xPCol, yPCol) of the colPu in the corresponding reference picture list may be set as the values of mvCol and refIdxCol, respectively, using the reference picture list indicated by signaling from the encoder.

The decoder may use the TMVP, which has the temporal motion vector and the reference picture index derived as motion information, as an MVP candidate. Here, when the distance between the colPic and the reference picture of the colPic is equal to the distance between a current picture and the reference picture of the current picture, the derived mvCol itself may be used as a temporal motion vector. When the distance between the colPic and the reference picture of the colPic is not equal to the distance between a current picture and the reference picture of the current picture, the derived mvCol may be scaled and used as a temporal motion vector.

As described above, the motion information of the colPu used in the TMVP may be stored by a predetermined motion data storage unit. That is, the colPu may be set by a motion data storage unit and the motion information of the colPu may be used as the motion information of blocks belonging to the corresponding motion data storage unit.

This is intended to reduce memory capacity for storing the motion information. The size of $N_1 \times N_2$ (where $N_1$ and $N_2$ are integers) block serving as a motion data storage unit may be set in advance or may be signaled from the encoder.

FIG. 7 is a diagram schematically illustrating a method of storing motion information. FIG. 7 shows an example where blocks B0 to B15 which are minimum units for setting motion information are set as a single motion data storage unit.

In this specification, the minimum unit for setting motion information is expressed a motion data block for the purpose of convenience for explanation. The motion data block may be a CU, a PU, a TU, or a unit other than the CU, the TU, and the PU. The motion data block may correspond to a block specified by $S_{TL}$, $S_{RB}$, and $S_{CTR}$ described with reference to FIG. 6. When the motion data block is a block of 4×4 samples, the motion data storage unit 700 is a block of 16×16 samples.

In FIG. 7, the motion vector of each motion data block BI (where I=0, . . . , 15) is specified as (XI, YI).

Whether to compress and store motion information by storage units and what storage unit to use may be set in advance or may be signaled from the encoder. When such information is signaled from the encoder, a flag (motion_vector_buffer_comp_flag) representing whether to compress and store motion information by storage units and compression ratio information (motion_vector_buffer_comp_ratio) on how many motion data blocks (or how many pixels) to set as a single storage unit may be used.

For example, when the value of motion_vector_buffer_comp_flag is 1, motion information may be compressed and stored by the storage units. When the value of motion_vector_buffer_comp_ratio is 4, 4×4 motion data blocks may be used as a single motion data storage unit as shown in FIG. 7.

The decoder may first apply an adaptive loop filter thereto and then may use the motion vector (X0, Y0) of the left-uppermost motion data block B0 in the motion data storage unit shown in FIG. 7 may be used as the representative value of the motion data storage unit 700. That is, the motion vector value of (X0, Y0) is assigned to the other 15 motion data blocks B1 to B15.

For the purpose of convenience for explanation in this specification, a motion data block having the motion vector stored as the representative motion vector of the motion data storage unit is referred to as a representative motion data block. When the motion data block is a PU, the representative motion data block may correspond to the colPu described with reference to FIG. 5.

When the block B0 which is the representative motion data block is a block not available for the inter prediction, for example, a block encoded in an intra prediction mode (hereinafter, referred to as "intra block" for the purpose of convenience for explanation), a zero motion vector (0, 0) is assigned to the 16 motion data blocks.

In other words, when the block B0 which is the first motion data block in the motion data storage unit 700 is not intra-coded, the motion vector (X0, Y0) of the motion data block B0 is stored as the representative motion vector of the 16 motion data blocks B0 to B15 in a motion vector buffer for deriving the temporal motion vector (TMVP). When the motion data block B0 is intra-coded, the motion vector (0, 0) is stored as the representative motion vector of the motion data storage unit 700 in the motion vector buffer for deriving the TMVP.

When motion information is compressed and stored as described above, the motion information of the left-uppermost block B0 is assigned to the motion data blocks in the motion data storage unit.

There is a problem in that encoding efficiency is lowered by collectively assigning the motion information of the motion data block B0 to the other motion data blocks in the motion data storage unit. For example, when the block B0 is an intra block and a block encoded in an inter prediction mode (hereinafter, referred to as an "inter block" for the purpose of convenience for explanation) is present in the other blocks in the motion data storage unit, (0, 0) is stored as the representative motion vector of the motion data storage unit.

A distortion may be caused by assigning the same motion vector without considering the reference indices of the motion data blocks in the motion data storage unit.

Figure 8:
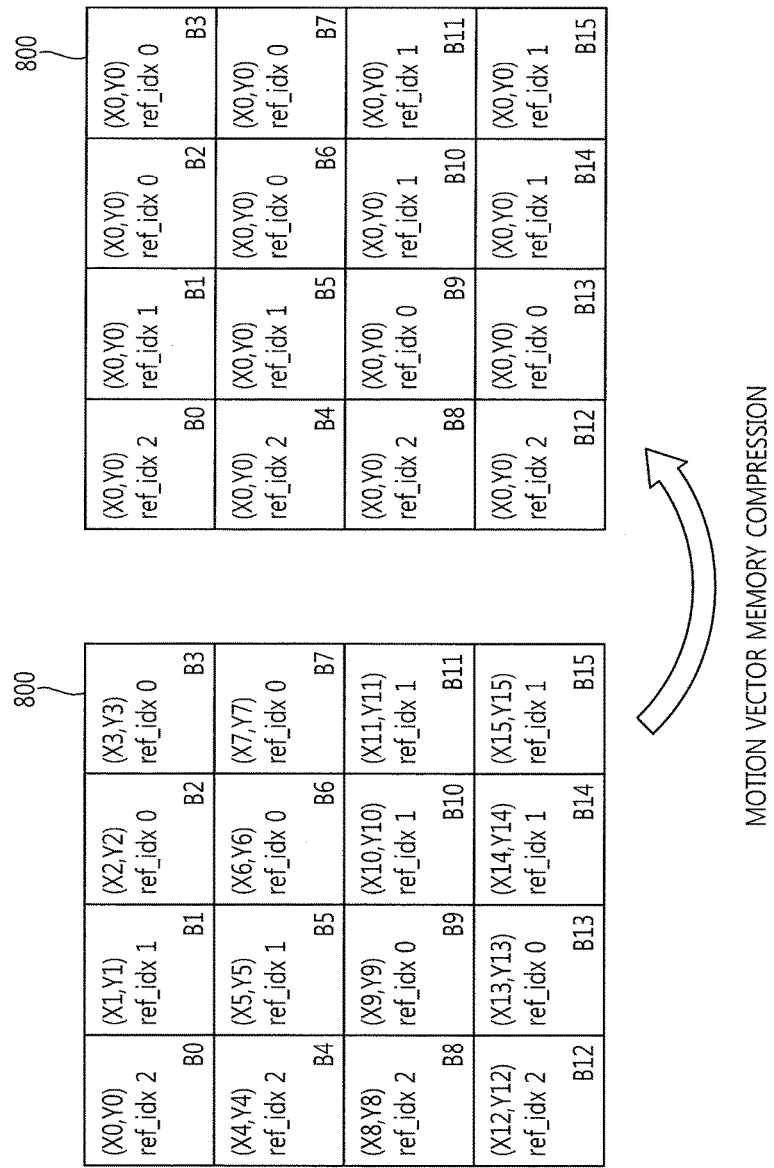
FIG. 8 is a diagram schematically illustrating an example where motion vector memory compression (motion vector storage reduction) is performed without considering a reference index.

FIG. 8 is a diagram schematically illustrating an example where motion vector memory compression (motion vector storage reduction) is performed without considering the reference indices. Here, the motion vector storage reduction means that a single motion vector (representative motion vector) or a single piece of motion information (representative motion information) is assigned to the motion data blocks in the motion data storage unit and the result is stored and used, as described above.

Referring to FIG. 8, the same motion vector (X0, Y0) is assigned to the motion information, that is, the motion vector (XI, YI) and the reference index ref_idxI (where I=0, . . . , 15), of the motion data blocks B0 to B15 in the motion data storage unit 800 regardless of the value of ref_idxI by the motion vector memory compression.

Therefore, it is necessary to consider a method of storing motion information used to derive the TMVP and capable of solving the above-mentioned problems.

The method of storing motion information used to derive the TMVP according to the invention will be specifically described below with reference to embodiments shown in the drawings.

Embodiment 1

In this embodiment, when N×N (where N is an integer) motion data blocks are used as a single motion data storage unit, a motion vector of a motion data block located at another specific position instead of the motion vector of the motion data block located at the left-top corner in the motion data storage unit is stored and used as the representative motion vector of the motion data storage unit.

Here, the motion vector to be used as the representative motion vector may be any one of (1) the motion vector of a motion data block located at the right-top (RT) corner, (2) the motion vector of a motion data block located at the bottom-left (BL) corner, (3) the motion vector of a motion data block located at the bottom-right (BR) corner, (4) the motion vector of the left-top (Center_LT) motion data block of the motion data blocks located at the center, (5) the motion vector of the right-top (Center_RT) motion data block of the motion data blocks located at the center, (6) the motion vector of the bottom-left (Center_BL) motion data block of the motion data blocks located at the center, and (7) the motion vector of the bottom-right (Center_BR) motion data block of the motion data blocks located at the center in the motion data storage unit.

The decoder may assign the motion vector of the motion data block specified out of (1) to (7) instead of the motion vector of the motion data block located at the top-left corner in the motion data storage unit to the motion data blocks and may use the assigned motion vector to derive the TMVP.

FIG. 9 is a diagram schematically illustrating motion information of motion data blocks when 4×4 motion data blocks are set as a single motion data storage unit in a system to which the invention is applied.

Referring to FIG. 9, motion vectors (XI, YI) of motion data blocks BI (where I=0, 1, . . . , 15) are shown. In this case, a motion data block other than the motion data block B0 may be designated as the representative motion data block and the motion vector of the designated representative motion data block may be used as the motion vector of the motion data storage unit 900.

Here, what motion data block to designate as the representative motion data block may be determined in advance or may be signaled from the encoder.

For example, when the motion data block B3 located at the right-top (RT) corner in the motion data storage unit 900 is designated as the representative motion data block, the motion vector of the motion data storage unit 900 is (X3, Y3). When the motion data block B12 located at the bottom-left (BL) corner in the motion data storage unit 900 is designated as the representative motion data block, the motion vector of the motion data storage unit 900 is (X12, Y12). When the motion data block B15 located at the bottom-right (BR) corner in the motion data storage unit 900 is designated as the representative motion data block, the motion vector of the motion data storage unit 900 is (X15, Y15). When the motion data block B5 located at the central left-top (Center_LT) corner in the motion data storage unit 900 is designated as the representative motion data block, the motion vector of the motion data storage unit 900 is (X5, Y5). When the motion data block B6 located at the central right-top (Center_RT) corner in the motion data storage unit 900 is designated as the representative motion data block, the motion vector of the motion data storage unit 900 is (X6, Y6). When the motion data block B9 located at the central bottom-left (Center_BL) corner in the motion data storage unit 900 is designated as the representative motion data block, the motion vector of the motion data storage unit 900 is (X9, Y9). When the motion data block B10 located at the central bottom-right (Center_BR) corner in the motion data storage unit 900 is designated as the representative motion data block, the motion vector of the motion data storage unit 900 is (X10, Y10).

On the other hand, the position of the motion data block having motion information used as the representative value in motion information compression and storage may be adaptively determined depending on the unit to be compressed, that is, the size of the motion data storage unit. For example, when the unit to be compressed is determined and transferred by the encoder, the position of the block (motion data block) having the motion vector (motion information) used for compression may be determined depending on the value of motion_vector_buffer_comp_ratio.

Specifically, when the unit to be compressed is determined by the encoder and is transferred to the decoder and the value of motion_vector_buffer_comp_ratio is 4, the motion vector of the motion data block located at the bottom-right corner may be used as the motion vector of the corresponding motion data storage unit (the motion data block located at the bottom-right corner may be used as the representative motion data block). When the value of motion_vector_buffer_comp_ratio is 8 or 16, the motion vector of the motion data block located at the central bottom-right (Center_BR) corner may be used as the motion vector of the corresponding motion data storage unit (the motion data block located at the central bottom-right corner may be used as the representative motion data block).

Here, the position of the representative motion data block which is determined depending on the units to be compressed, that is, various sizes of the motion data storage unit is not limited to the above-mentioned position.

Embodiment 2

This embodiment provides a method of preventing a zero motion vector from being stored as the representative motion vector because the representative motion data block from which the representative motion vector value is designated is an intra block.

In this embodiment, it is determined whether a block is an intra block or an inter block by scanning the motion data blocks in the motion data storage unit in a predetermined order, and the motion vector of the first motion data block detected as the inter block is used as the representative motion vector of the motion data storage unit.

Figure 10:
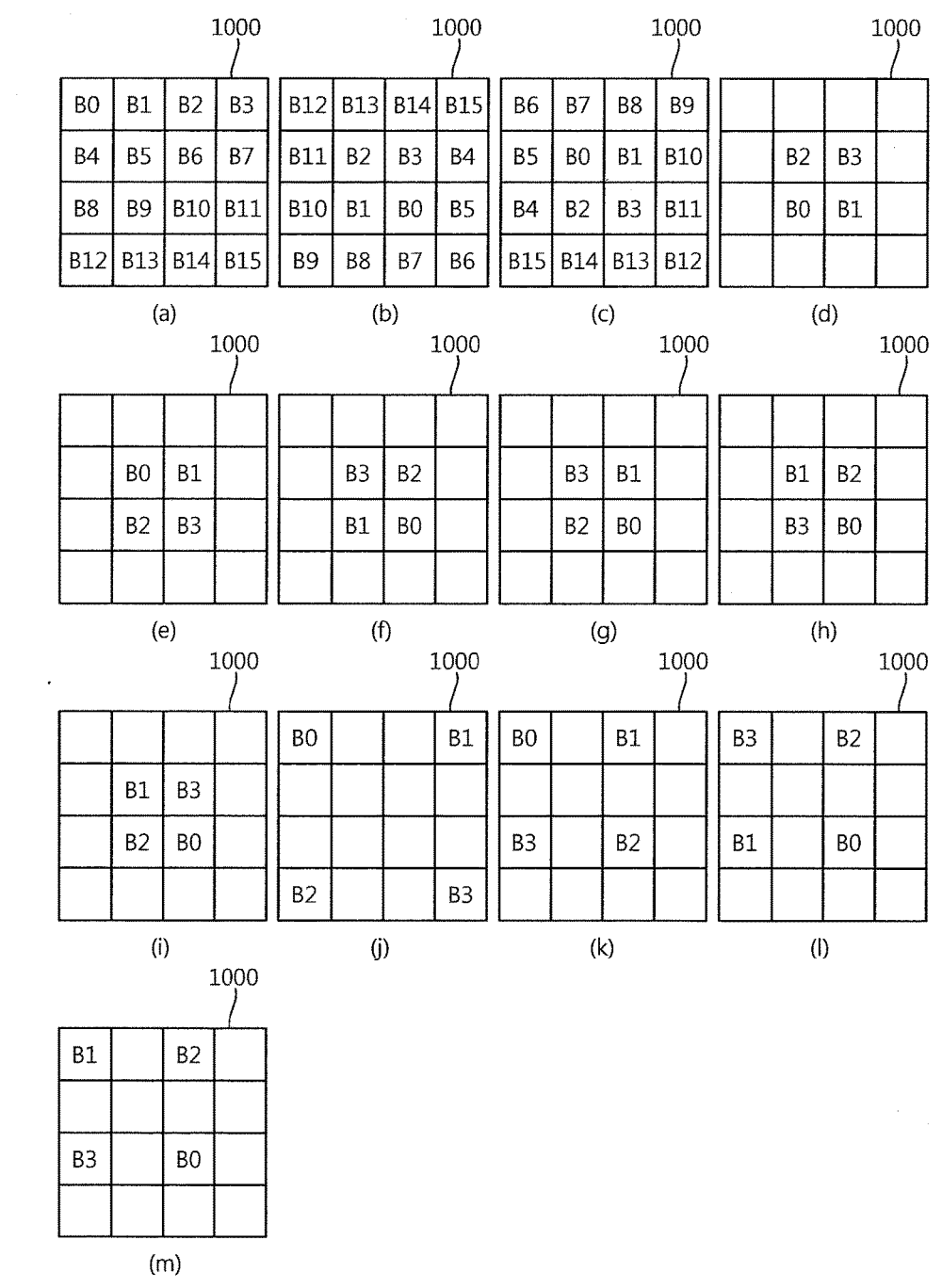

FIG. 10 is a diagram schematically illustrating an order for searching for a prediction mode in which a motion data block in a motion data storage unit is coded according to the invention.

FIG. 10 shows an example where a motion data storage unit 1000 includes 4×4 motion data blocks B0 to B15. In the motion data blocks BI (where I=0, 1, . . . , 15) in FIG. 10, I represents the scan order.

In the example shown in (a) of FIG. 10, the motion data block located at the top-left corner in the motion data storage unit 1000 is designated as the first block B0 for scanning the motion data blocks, and it is determined whether it is an inter block or an intra block (or whether it is available, that is, whether a motion vector is stored in L0 when a motion vector for L0 is stored) in the raster scan order.

In the example shown in (b) of FIG. 10, the motion data block located at the central bottom-right corner in the motion data storage unit 1000 is set as the first block B0 to be scanned and the scanning is performed in the spiral clockwise direction.

In the example shown in (c) of FIG. 10, the motion data block located at the central top-left corner in the motion data storage unit 1000 is set as the first block B0 to be scanned and the scanning is performed in the spiral clockwise direction.

(d) to (m) of FIG. 10 show embodiments for reducing a computational load in consideration of the computational load based on the scanning.

In the example shown in (d) of FIG. 10, only motion data blocks located at the center of the motion data storage unit 1000 are scanned, the motion data block located at the central bottom-right corner is set as the first block B0 to be scanned and the scanning is performed in the clockwise direction.

In the example shown in (e) of FIG. 10, only motion data blocks located at the center of the motion data storage unit 1000 are scanned, the motion data block located at the central top-left corner is set as the first block B0 to be scanned and the scanning is performed in the clockwise direction.

In the example shown in (f) of FIG. 10, only motion data blocks located at the center of the motion data storage unit 1000 are scanned and the scanning is performed in the order of the motion data block (B0) located at the central bottom-right corner→the motion data block (B1) located at the central bottom-left corner→the motion data block (B2) located at the central top-right corner→the motion data block (B3) located at the central top-left corner.

In the example shown in (g) of FIG. 10, only motion data blocks located at the center of the motion data storage unit 1000 are scanned and the scanning is performed in the order of the motion data block (B0) located at the central bottom-right corner→the motion data block (B1) located at the central top-right corner→the motion data block (B2) located at the central bottom-left corner→the motion data block (B3) located at the central top-left corner.

In the example shown in (h) of FIG. 10, only motion data blocks located at the center of the motion data storage unit 1000 are scanned and the scanning is performed in the order of the motion data block (B0) located at the central bottom-right corner→the motion data block (B1) located at the central top-left corner→the motion data block (B2) located at the central top-right corner→the motion data block (B3) located at the central top-left corner.

In the example shown in (i) of FIG. 10, only motion data blocks located at the center of the motion data storage unit 1000 are scanned and the scanning is performed in the order of the motion data block (B0) located at the central bottom-right corner→the motion data block (B1) located at the central top-left corner→the motion data block (B2) located at the central bottom-left corner→the motion data block (B3) located at the central top-right corner.

In the example shown in (j) of FIG. 10, only motion data blocks located at the corners of the motion data storage unit 1000 are scanned, the motion data block located at the central top-left corner is set as the first block B0 to be scanned and the scanning is performed in the clockwise direction.

In the examples shown in (k) to (m) of FIG. 10, the scanning unit is set to double the scanning unit set in (a) to (c) of FIG. 10 and the scanning is performed. For example, when each motion data block in (a) to (c) of FIG. 10 is a block of 4×4 samples, the scanning is performed in the unit of blocks of 8×8 samples in (k) to (m) of FIG. 10. Therefore, the first motion data block located at the top-left corner in the block of 8×8 samples is scanned.

When the motion data storage unit 1000 includes 4×4 motion data blocks, the top-left motion data block in each of 2×2 motion data blocks scanned in the clockwise direction from the top-left 2×2 motion data blocks in the example shown in (k) of FIG. 10. For example, the scanning order is B0→B1→B2→B3 as shown in the drawing.

In the example shown in (1) of FIG. 10 the top-left motion data block in each of 2×2 motion data blocks scanned in the counterclockwise direction from the bottom-left 2×2 motion data blocks. For example, the scanning order is B0→B1→B2→B3 as shown in the drawing.

In the example shown in (m) of FIG. 10 the top-left motion data block in each of 2×2 motion data blocks scanned in the zigzag direction from the bottom-left 2×2 motion data blocks. For example, the scanning order is B0→B1→B2→B3 as shown in the drawing.

In the embodiment shown in FIG. 10, the decoder uses the motion vector of the motion data block first detected to be encoded in an inter prediction mode as the representative motion vector of the corresponding motion data storage unit 1000.

Embodiment 3

In Embodiments 1 and 2, representative motion information of a motion data storage unit may be stored on the basis of the information of an intra block. For example, when the motion data block located at a position to be referred to in Embodiment 1 is an intra block (or when the motion vector of a target reference list is not available) and when all the motion data blocks of the motion data storage unit are intra blocks (or when the motion vector of a target reference list is not available), the zero motion vector (0, 0) is used as the representative motion vector of the motion data storage unit.

This embodiment provides a method of storing motion information with reference to neighbouring blocks of a motion data storage unit of a current block (hereinafter, referred to as a "current motion data storage unit").

Figure 11:
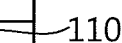
FIG. 11 is a diagram schematically illustrating a method of storing motion information on a current motion data storage unit using neighbouring blocks of the current motion data storage unit according to the invention.

FIG. 11 is a diagram schematically illustrating a method of storing motion information of a current motion data storage unit using neighbouring blocks of the current motion data storage unit according to the invention. FIG. 11 shows an example where a motion data storage unit includes 4×4 motion data blocks.

Referring to FIG. 11, when all motion data blocks B0 to B15 in a current motion data storage unit 1100 are intra blocks, motion information of the current motion data storage unit 1100 is stored and used using the motion information of the neighbouring blocks B16 to B35 of the current motion data storage unit 1100. At this time, the neighbouring blocks B16 to B35 may be motion data blocks.

When only one block of the neighbouring blocks B16 to B35 is an inter block, the motion information of the block is stored and used as the motion information of the current motion data storage unit 1100 including the intra blocks.

At this time, when only one block of the neighbouring blocks B16 to B35 is an inter block having a motion vector of a target reference list, the motion information of the block may be stored and used as the motion information of the current motion data storage unit 1100 including the intra blocks.

When two or more blocks of the neighbouring blocks B16 to B35 are inter blocks, the representative motion vector of the current motion data storage unit may be determined using any one method of (1) to (3) described below.

(1) The neighbouring blocks are scanned in a predetermined order and the motion vector of a block first detected as a block having a reference index ref_idx of 0 is used as the motion vector of the current motion data storage unit. In the example shown in FIG. 11, the neighbouring blocks are coded in an inter prediction mode in the clockwise direction from the neighbouring block B16 located at the top-left corner in the current motion data storage unit. Accordingly, a block having a reference index value of 0 is detected and the motion information of the first-detected block is used as the motion information of the current motion data storage unit.

FIG. 11 shows an example where the neighbouring blocks are scanned in the clockwise direction from the top-left neighbouring block of the current motion data storage unit, but this embodiment is not limited to this direction, but the neighbouring blocks may be scanned in the clockwise direction or the counterclockwise direction from various neighbouring blocks such as the top-right neighbouring block, the bottom-left neighbouring block, and the bottom-right neighbouring block.

(2) The median of the motion vectors of the neighbouring blocks of the current motion data storage unit is used as the motion vector of the current motion data storage unit. Intra blocks of the neighbouring blocks may be excluded in calculating the median value, or the motion vector of the intra blocks may be set to (0, 0) and may be used to calculate the median value.

(3) The motion information of the block having the smallest pixel difference from the neighboring intra blocks (or blocks in which the motion vectors of a target reference list is not available) in the current motion data storage unit out of the inter blocks around the current motion data storage unit is used as the motion information of the current motion data storage unit.

For example, a difference between the bottom-right pixel of the block B16 and the top-left pixel of the block B0 is calculated. Differences between the eight bottom pixels of the block B17 and the neighboring intra block B0 (or blocks in which the motion vectors of a target reference list is not available) are calculated and the resultant value is divided by 8 to calculate the average pixel difference. The pixel differences between the neighbouring blocks and the intra blocks (or blocks in which the motion vectors of a target reference list is not available) in the current motion data storage unit are calculated, and the motion information of the neighbouring block having the smallest difference is used as the motion information of the current motion data storage unit. When there are neighbouring blocks having the same pixel difference, a priority order may be given thereto in advance.

For example, when the neighbouring blocks are ranked as shown in FIG. 11, the motion information of the neighbouring block having the lower rank may be used as the motion information of the current motion data storage unit.

On the other hand, when all the neighbouring blocks of the current motion data storage unit are intra blocks (or when all the neighbouring blocks are not available), the motion vector of the current motion data storage unit may be set to a zero vector.

Embodiment 4

This embodiment provides a method of designating and storing a representative value for reference indices as well as the motion vector of the motion data storage unit in motion information compression and storage (motion information storage reduction).

For example, in Embodiments 1 to 3, the memory compression or the storage reduction of storing only one motion vector by the motion data storage units is described above, but a method of designating a representative reference index value of a motion data storage unit and storing the designated representative reference index value along with the motion vector value will be described in Embodiment 4.

Similarly to reduction of a memory buffer for storing the motion vectors in Embodiments 1 to 3, the memory buffer for storing the reference indices may be reduced in Embodiment 4.

Specifically, in this embodiment, when a representative motion data block of a motion data storage unit is determined, the reference index as well as the motion vector of the representative motion data block is assigned to the other motion data blocks in the motion data storage unit. The decoder may use representative motion information (the motion information of the representative motion data block) as the motion information of the blocks in the motion data storage unit. Therefore, it is possible to solve the problem with a distortion because the motion vector value of the representative motion data block is assigned to the motion vectors of the motion data blocks of the motion data storage unit, but the reference indices are maintained.

FIG. 12 is a diagram schematically illustrating a state in which motion information memory compression (motion information storage reduction) is performed on reference indices as well as motion vectors when performing motion vector memory compression (motion vector storage reduction). Here, the motion information storage reduction means that only one piece of motion information (representative motion information) is assigned to the motion data blocks of a motion data storage unit and is stored and used as described above, similarly to the motion vector storage reduction.

FIG. 12 shows an example where a motion data storage unit includes 4×4 motion data blocks.

FIG. 12 shows an example where the motion information (the motion vector and the reference index) of the motion data block B0 located at the top-left corner of the motion data storage unit 1200 is used as representative motion information.

Referring to FIG. 12, the motion vector and the reference index of the motion data block B0 are assigned as motion information of a motion data storage unit 1210 by the motion information storage reduction. In the example shown in FIG. 12, the motion vector and the reference index of the block B0 which is the representative motion data block are (X0, Y0) and ref_idx2, respectively. Accordingly, when the motion data storage unit 1210 includes the block specified by $S_{CRT}$ or $S_{BR}$ in FIGS. 5 and 6, the motion vector (X0, Y0) and the reference index ref_idx2 of the block B0 may be used to derive the TMVP. The use of the reference index of the colPu along with the motion vector of the colPu corresponds to the storage and use of the reference index of the representative motion data block along with the motion vector thereof as the motion information of the motion data storage unit.

The method according to Embodiment 4 may be applied along with the methods according to Embodiments 1 to 3. For example, when the representative motion data block is specified according to Embodiment 1 or 2, the motion vector and the reference index of the corresponding motion data block may be together assigned to the motion data storage unit. When a neighbouring block of which the motion vector is used is determined out of the neighbouring blocks of the current motion data storage unit according to Embodiment 3, the reference index and the motion vector of the determined neighbouring block may be assigned to the current motion data storage unit.

On the other hand, when an intra block is included in target blocks (motion data blocks in the motion data storage unit) of which the motion information may be compressed according to Embodiment 4, the reference index of the representative motion data block may be assigned to only the other motion data blocks without changing the reference index of the intra block.

That is, instead of setting the same reference index for all the motion data blocks of the motion data storage unit, only the reference indices of the other inter blocks may be changed to the reference index of the representative motion data block and the result may be stored without changing the reference index of the intra block in the motion data storage unit.

When only the reference indices of the inter blocks are changed to the reference index of the representative motion data block, the reference index values of the corresponding motion data block in L1 and L0 may be directly read and determined to find out the prediction direction of the col block (the L0 direction, the L1 direction, the bi-prediction, or the intra prediction).

Figure 13:
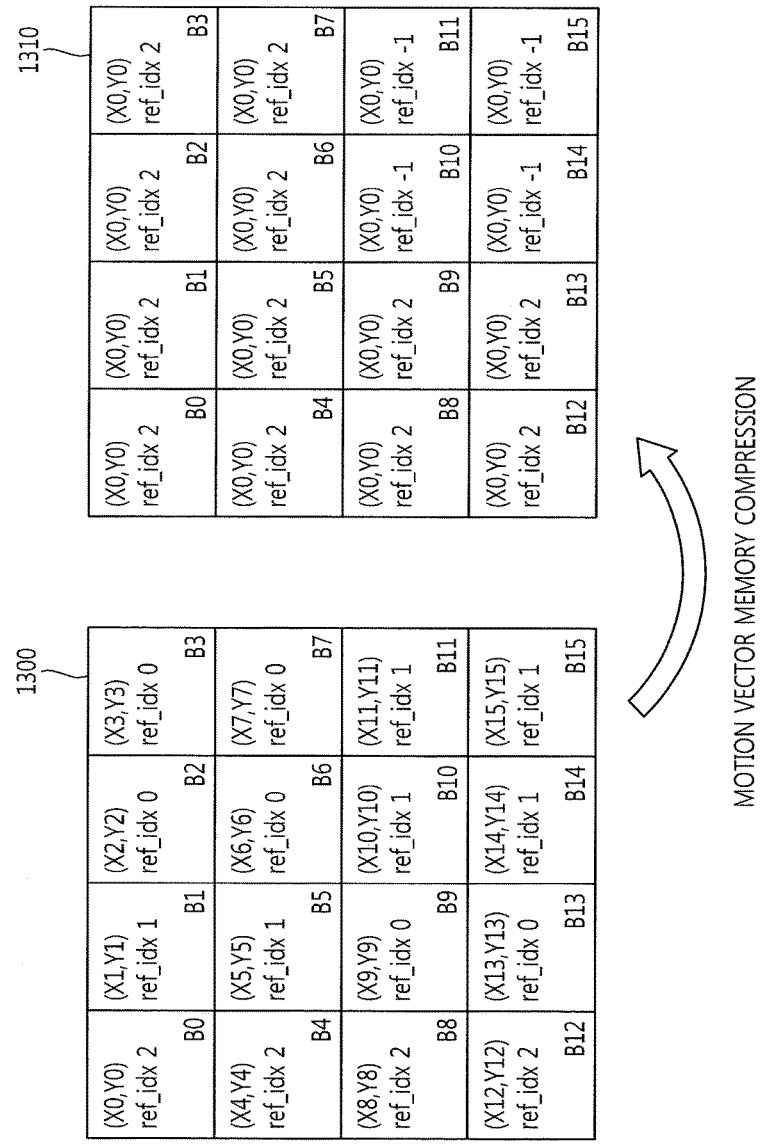
FIG. 13 is a diagram schematically illustrating a state in which motion information memory compression of a motion vector and a reference index is performed on only an inter block according to the invention when performing motion vector memory compression.

FIG. 13 is a diagram schematically illustrating a state in which motion information memory compression of a motion vector and a reference index is performed on only an inter block according to the invention when performing motion vector memory compression. FIG. 13 shows an example where the motion data storage unit includes 4×4 motion data blocks.

In the example shown in FIG. 13, it is assumed that the blocks B10, B11, B14, and B15 out of the motion data blocks B0 to B15 in a motion data storage unit 1300 are intra blocks (of which the reference index has a value of −1).

Therefore, only the reference indices of the inter blocks other than the intra block may be changed to the reference index of the representative motion data block and the motion vector and the reference index of the motion data storage unit 1310 may be set. Even when the motion vectors of the intra blocks B10, B11, B14, and B15 in the motion data storage unit 1310 are changed to the motion vector of the representative motion data block, the reference indices are not changed but maintained.

According to the method described with reference to FIG. 13, the motion vector of the col block may be derived using the stored reference index values regardless of the picture type (the P picture, the B picture, and the I picture) of the col block, and the motion vector of the col block may be made not to be derived from the intra block.

The method described with reference to FIG. 13 may be applied to Embodiments 1 to 3. For example, when the representative motion data block is specified in Embodiment 1 or 2 and the motion vector and the reference index of the corresponding motion data block are assigned to the motion data storage unit, the reference index of the intra block may not be changed. When a neighbouring block of which the motion vector is used is determined out of the neighbouring blocks of the current motion data storage unit according to Embodiment 3 and the reference index of the determined neighbouring block is assigned to the current motion data storage unit, the reference index of the intra block may not be changed.

On the other hand, in FIG. 13, difference reference indices may be assigned to the motion data blocks of the same motion data storage unit. In this case, only the motion vector is compressed and the reference indices are not compressed.

Figure 14:
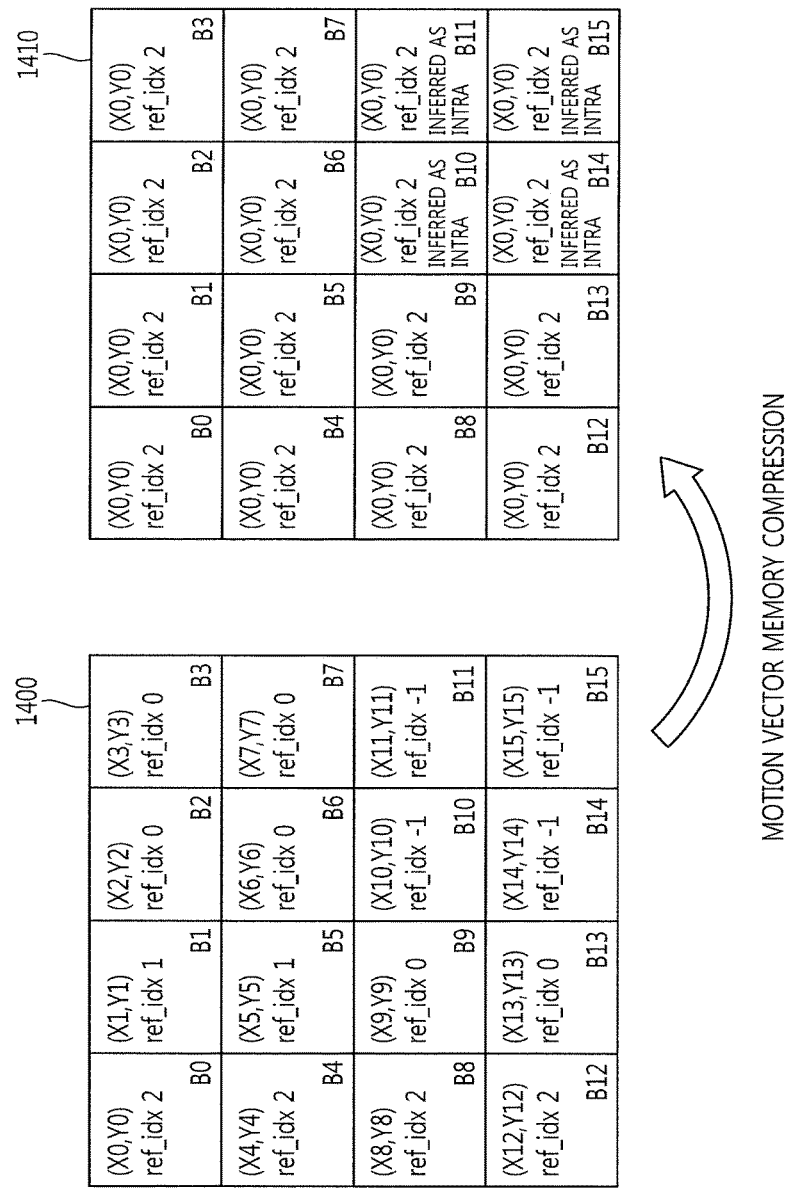
FIG. 14 is a diagram schematically illustrating a method of inferring an intra block in a state in which motion information memory compression of a motion vector and a reference index is performed according to the invention when performing motion vector memory compression.

In order to solve this problem, FIG. 14 shows a method of storing only one representative value as the reference index as shown in FIG. 12 but inferring that a block is an intra block.

FIG. 14 is a diagram schematically illustrating a method of inferring an intra block in a state in which motion information memory compression of a motion vector and a reference index is performed according to the invention when performing motion vector memory compression. FIG. 14 shows an example where the motion data storage unit includes 4×4 motion data blocks.

In the example shown in FIG. 14, it is assumed that the blocks B10, B11, B14, and B15 out of the motion data blocks B0 to B15 in a motion data storage unit 1300 are intra blocks (of which the reference index has a value of −1).

Referring to FIG. 14, the reference index value of the representative motion data block B0 is assigned to the blocks B10, B11, B14, and B15 which are intra blocks. Here, even when the reference index values stored for the blocks B10, B11, B14, and B15 are larger than 0, the decoder may infer that the corresponding blocks are intra blocks. That is, the decoder may recognize that the motion information of the blocks B10, B11, B14, and B15 are not available.

It may be determined whether a motion data block is an intra block or an inter block by the use of the prediction type (an intra prediction mode or an inter prediction mode) of the CU to which the corresponding motion data block belongs.

The method described with reference to FIG. 14 may be applied along with Embodiments 1 to 3. For example, when a representative motion data block is specified according to Embodiment 1 or 2, the motion vector and the reference index of the corresponding motion data block may be assigned to the motion data storage unit and it may be determined whether the corresponding motion data block is an intra block on the basis of the prediction type of the CU to which the corresponding block belongs. When a neighbouring block of which the motion vector is used is determined out of the neighbouring blocks of a current motion data storage unit according to Embodiment 3, the reference index of the determined neighbouring block may also be assigned to the current motion data storage unit and it may be determined whether the determined neighbouring block is an intra block on the basis of the prediction type of the CU to which the corresponding block belongs.

According to the method described with reference to FIG. 14, it is possible to save the memory for storing the reference indices and to reduce a memory bandwidth. A motion vector may be made not to be derived from an intra block.

Embodiment 5

This embodiment provides a method of combining Embodiment 2 and Embodiment 4 and considering whether a reference index is 0 as a motion information storage reduction method.

That is, similarly to the method described in Embodiment 2, it is determined whether motion data blocks of a motion data storage unit are an inter block or an intra block and it is determined whether the reference index value thereof is 0 when a motion data block is an inter block, on the basis of a predetermined order.

In Embodiment 5, the decoder may select a first-detected motion data block, which is encoded in an inter prediction mode and which has a reference index value of 0, as the representative motion data block while scanning the motion data blocks of the motion data storage unit in a predetermined order. The decoder may assign and use the motion vector and the reference index of the selected representative motion data block to the other motion data blocks of the motion data storage unit.

Embodiment 6

This embodiment provides a method of compressing and storing a prediction mode along with the motion vector and the reference index in the motion information storage reduction (motion vector memory reduction).

As for a decoded picture, information on the prediction mode may be stored by the PU. At this time, the PU of which information on the prediction mode is stored may be a smallest prediction unit or a motion data block, and the smallest prediction unit or the motion data block may be a block of 4×4 samples. For example, information on whether the prediction mode is an intra mode or an inter mode and on which one is used among a skip mode or a merge mode or an AMVP when the prediction mode is an inter mode may be stored.

The information on the prediction mode may be stored in a decoded picture buffer (DPB) to check the state of the col block. In this case, when the motion vector buffer compression (motion vector memory compression) is used, the information on the prediction mode may be stored by motion data storage units without storing the information on the prediction mode by PU units.

Therefore, in this embodiment, when the motion vector memory compression (motion information storage reduction) is applied, the prediction mode of the representative motion data block of the motion data storage unit is also compressed (stored).

Figure 15:
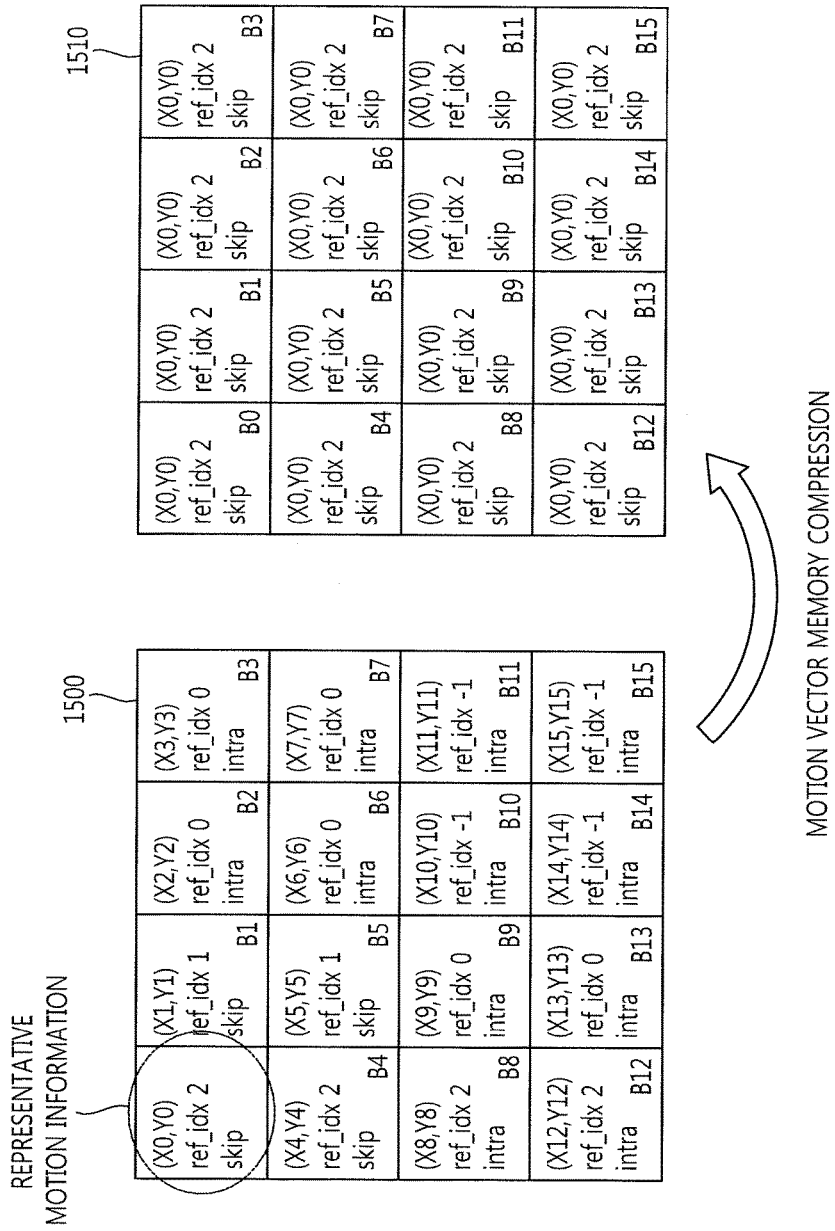
FIG. 15 is a diagram schematically illustrating a state in which information on a prediction mode is compressed according to the invention when performing motion vector memory compression.

FIG. 15 is a diagram schematically illustrating a state in which information on a prediction mode is compressed according to the invention when performing motion vector memory compression. FIG. 15 shows an example where a motion data storage unit includes 4×4 motion data blocks.

Referring to FIG. 15, 16 motion data blocks of a motion data storage unit 1500 are encoded in various prediction modes. In FIG. 15, it is assumed that the representative motion data block of the motion data storage unit 1500 is a motion data block B0 located at the top-left corner.

The same motion vector, reference index, and prediction mode as the representative motion data block B0 are assigned to 4×4 motion data blocks in a motion data storage unit 1510 by the motion vector memory compression. Therefore, the motion vector of the motion data blocks B0 to B15 in the motion data storage unit 1510 is stored as (X0, Y0), the reference index thereof is stored as ref_idx 2, and the prediction mode thereof is stored as a skip mode.

For example, when the motion data storage unit 1510 includes the block specified by $S_{RB}$ or $S_{CRT}$ in FIGS. 5 and 6, (X0, Y0) which is the motion vector of B0, ref_idx 2 which is the reference index thereof, and a skip mode which is the prediction mode thereof may be used as motion information for deriving the TMVP of the current block.

Embodiment 7

This embodiment provides a method of more effectively performing a compression process in the motion information storage reduction, for example, when compressing the motion vector buffer memory.

When the motion information storage reduction (or the motion vector buffer compress (MV buffer compression) is applied, the degradation in performance may be suppressed as the local motion information pieces are similar to each other, depending on the characteristics of a picture. The similarity of the local motion may vary depending on a picture and, for example, there may be a difference in compression performance between when a 16:9 picture is compressed by the motion data storage unit of 16×16 pixel blocks and when a 4:3 picture is compressed by the motion data storage unit of 16×16 pixel blocks.

Therefore, this embodiment provides a method of more dynamically compressing a buffer memory for storing motion information.

The encoder may signal information on the compression ratio to the decoder, when information indicating compression of motion information or motion vectors at the sequence level is transferred. For example, when the motion information of N×M (where N and M are integers) sample blocks are compressed and stored as a single motion information piece, the encoder may signal the value of N relevant to the compression ratio in the horizontal direction and the value of M relevant to the compression ratio in the vertical direction.

The encoder may transfer information such as motion_vector_buffer_comp_x_ratio_log2 as the information on the compression ratio in the horizontal direction in the motion information storage reduction and transfer information such as motion_vector_buffer_comp_y_ratio_log2 as the information on the compression ratio in the vertical direction.

For example, when the value of motion_vector_buffer_comp_x_ratio_log2 transferred by the encoder is 2 and the value of motion_vector_buffer_comp_y_ratio_log2 is 2, it may be indicated that compression of storing the motion information in the unit of 4×4 samples is performed.

When the value of motion_vector_buffer_comp_x_ratio_log2 transferred by the encoder is 3 and the value of motion_vector_buffer_comp_y_ratio_log2 is 2, it may be indicated that compression of storing the motion information in the unit of 8×4 samples is performed.

Therefore, the compression storage ratio of motion information may be determined in consideration of the characteristics of a picture processed by the encoder and may be transferred to the decoder. The decoder may acquire information of the motion vector and/or the reference index for deriving the TMVP on the basis of the transferred compression storage ratio of motion information.

According to Embodiment 7, since video data is compressed and stored in consideration of the characteristics of a picture, it is possible to maximally reduce loss in compression of a temporal motion vector buffer.

In this case, the reference index buffer compression (memory compression) may be performed in the same way using the information on the motion vector buffer compression. Information for the reference index buffer compression may be signaled separately to perform the buffer compression separately from the motion vector buffer compression.

On the other hand, the method of determining and signaling the size of a sample block which is a unit for storing motion information, that is, the compression and storage ratio, to the decoder may be similarly applied to Embodiments 1 to 6. In this case, when the size of a sample block as the compression and storage unit determined by the encoder is N×M, the motion data storage unit in Embodiments 1 to 6 is a block with a size of N×M samples.

Embodiment 8

This embodiment provides a method of using a neighbouring block of a motion data storage unit instead of the motion data block in the motion data storage unit as the representative motion data block used to compress and store motion information. For example, in this embodiment, motion information may be compressed and stored using a 4×4 pixel block at the right-bottom corner adjacent to a current motion data storage unit as the representative motion data block having the motion information on the current motion data storage unit instead of using any motion data block in the current motion data storage unit which is a 16×16 pixel block as the representative motion data block.

Figure 16:
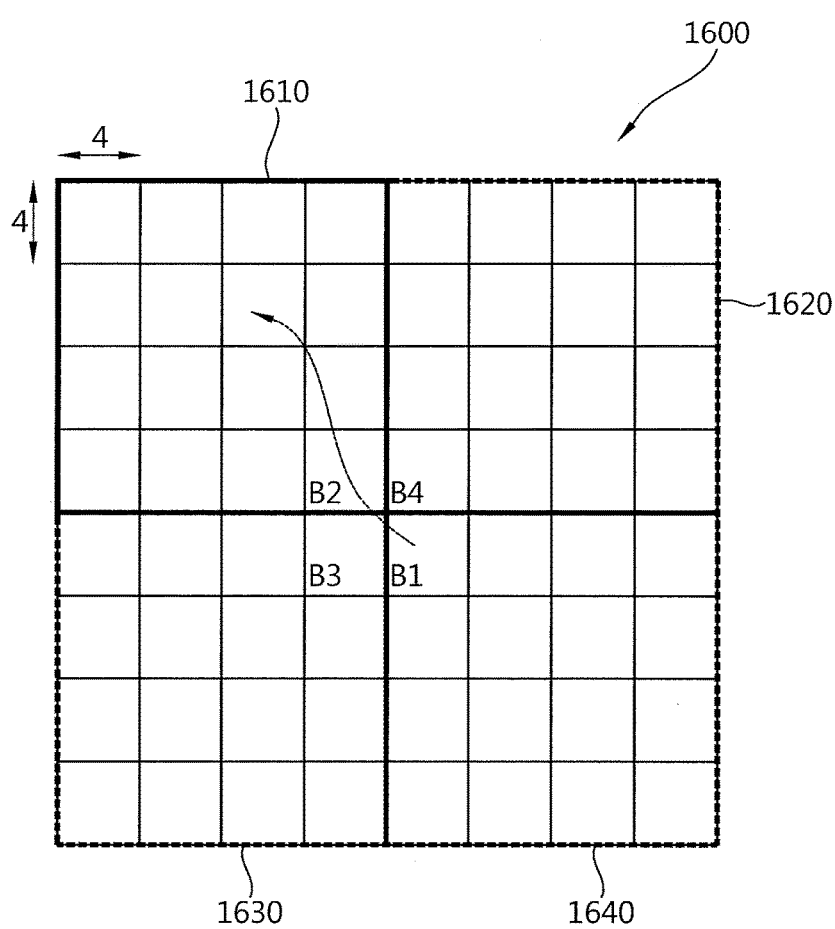
FIG. 16 is a diagram schematically illustrating a method of utilizing information on blocks adjacent to a current motion data storage unit according to the invention when compressing and storing motion information.

FIG. 16 is a diagram schematically illustrating a method of utilizing information on blocks adjacent to a current motion data storage unit according to the invention when compressing and storing motion information. FIG. 16 shows an example where the motion data storage unit includes 4×4 motion data blocks.

In the example shown in FIG. 16, a PU 1600 includes four motion data storage units 1610, 1620, 1630, and 1640 and each motion data storage unit includes motion data blocks which are 4×4 pixel blocks.

According to this embodiment, motion information (also referred to as "motion data") of a 4×4 pixel block B1 located adjacent to the right-bottom corner of the current motion data storage unit 1610 is used as the motion information of the current motion data storage unit 1610 to compress and store the motion information (such as the motion vector, the reference index, and the prediction mode) of the current motion data storage unit 1610 which is a 16×16 pixel block. That is, the block B1 is used as the representative motion data block of the current motion data storage unit 1610.

Therefore, the motion information of the block B1 is assigned to all the blocks in the current motion data storage unit 1610.

The motion information of the neighbouring block adjacent to the right-bottom corner is assigned as the motion information of the respective motion data storage unit to the other motion data storage units 1620, 1630, and 1640 in the PU 1600 in the same way.

Therefore, when the TMVP is taken out from a reference picture of which the motion information is compressed and stored in the process of prediction of a current block, a, and the motion information of the motion data blocks (blocks located on the central top-left side, the central left-bottom side, the central top-right, and the central right-bottom side) located at the center of the current PU may be simply used without performing an additional process of searching out neighbouring PU located at the right-bottom corner of a current PU every time and taking out the motion information of the top-left block of the motion data storage unit including the corresponding PU as described above.

The motion data blocks located at the center of the current PU are B1, B2, B3, and B4 in the example shown in FIG. 16.

At this time, when B1 is an intra block or an unavailable block, the other motion data blocks B2, B3, and B4 located at the center of the PU 1600 included the current motion data storage unit 1610 may be used as the representative motion data block of the current motion data storage unit 1610.

In this case, the motion data blocks are scanned for the current motion data storage unit 1610 in any one order of (1) B1→B2→B3→B4, (2) B1→B3→B4→B2, (3) B1→B4→B3→B2, and an inter block or an available block first detected may be used as the representative motion data block of the current motion data storage unit 1610. The scanning order may be determined in advance or may be signaled from the encoder.

Embodiment 9

When the width or the height of a picture is not an integer multiple of a compression and storage unit of motion information (motion data storage unit), the motion information of a block having a size smaller than the compression and storage unit of motion information may be compressed and stored.

This embodiment provides a method of compressing and storing motion information of pixel block smaller than the compression and storage unit of motion information.

Figure 17:
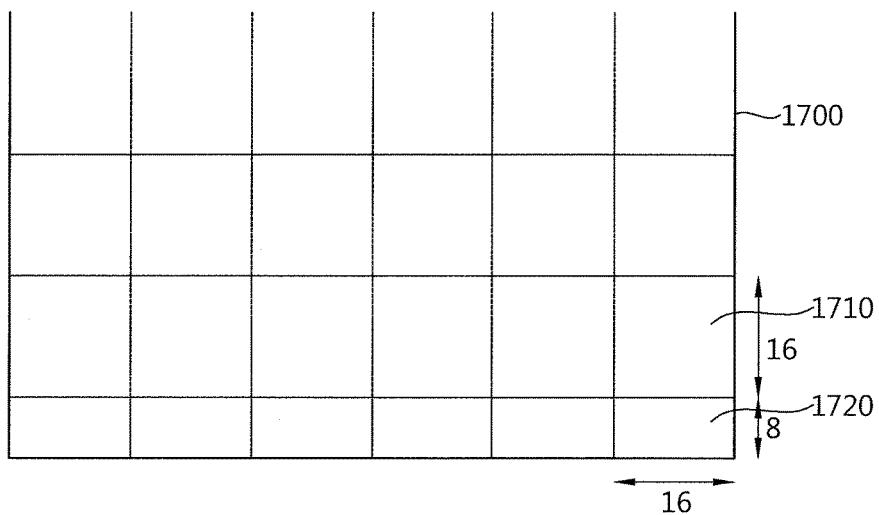
FIG. 17 is a diagram schematically illustrating a method of compressing and storing motion information of pixel blocks smaller than a compression and storage unit of motion information according to the invention when compressing and storing motion information.

FIG. 17 is a diagram schematically illustrating a method of compressing and storing motion information of a pixel block smaller than a compression and storage unit of motion information according to the invention when compressing and storing motion information. FIG. 17 shows an example where the size of a picture is not an integer multiple of the motion data storage unit and 16×16 pixel samples are used as a single motion data storage unit.

Referring to FIG. 17, a picture 1700 includes plural motion data storage units. In the example shown in FIG. 17, a motion data storage unit is a 16×16 pixel block such as a block 1710 as described above. Here, since the size of the picture 1700 and the size of the motion data storage unit are not proportional to each other, a block (hereinafter, referred to as a "remaining block" for the purpose of convenience for explanation) having a size smaller than the motion data storage unit is present at the boundary of the picture like a block 1720. In the example shown in FIG. 17, the size of the remaining block is assumed to be 8×16.

In order to perform inter prediction using an MVP, it is necessary to compress and store motion information of the remaining block. In Embodiment 9, a method of storing motion information of the remaining block depending on what motion data block to use as the representative motion data block of the motion data storage unit will be described. The position of the motion data block which may be used as the representative motion data block is the same as described in Embodiment 1.

The method of compressing and storing the motion information of the remaining block depending on the position of the representative motion data block specified in Embodiment will be described below.

Figure 18:
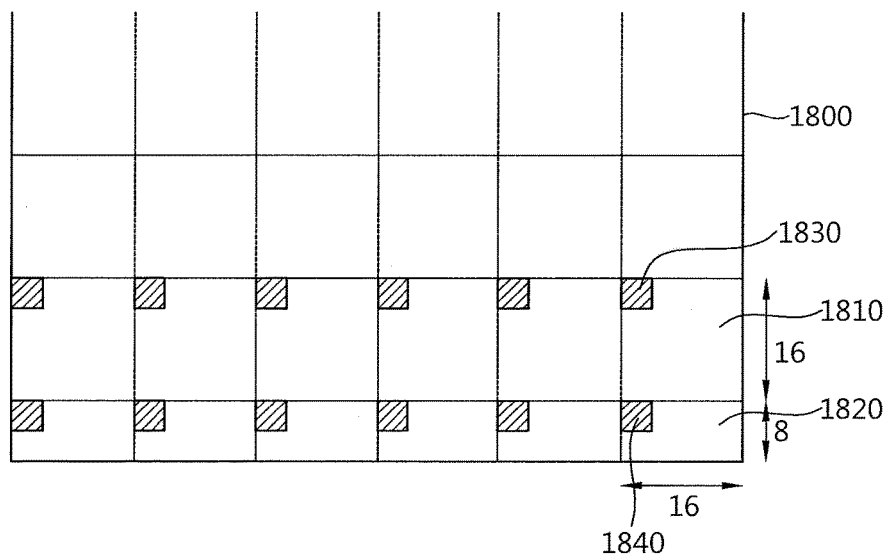
FIG. 18 is a diagram schematically illustrating a method of compressing and storing motion information of a remaining block according to the invention when a representative motion data block is a top-left block of a motion data storage unit.

(1) Case where a Representative Motion Data Block is a Top-Left Motion Data Block in a Motion Data Storage Unit FIG. 18 is a diagram schematically illustrating a method of compressing and storing motion information of a remaining block according to the invention when a representative motion data block is a top-left block of a motion data storage unit.

In FIG. 18, it is assumed that a motion data storage unit 1810 in a picture 1800 is a 16×16 pixel block and a remaining block 1820 is a 16×8 pixel block. The method to be described with reference to FIG. 18 may be applied to motion data storage units and remaining blocks having sizes other than described above.

When the top-left motion data block 1830 is used as the representative motion data block of the motion data storage unit 1810 and the unit of block of which motion information should be compressed and stored is reduced in the vicinity of the boundary of the picture 1800 like a remaining block 1820, the representative motion data block of the remaining block 1820 may be determined using the same method as the motion data storage unit 1810.

Therefore, the motion information of the motion data block 1840 located at the top-left corner of the remaining block 1820 is used as the motion information of the remaining block 1820.

Therefore, the representative motion data block of the remaining block may be determined using the same method as the motion data storage unit.

Figure 19:
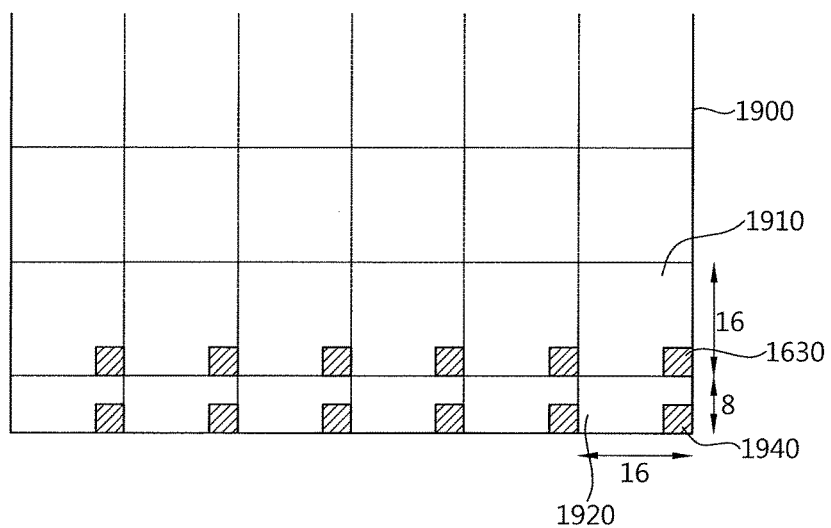
FIG. 19 is a diagram schematically illustrating a method of compressing and storing motion information of a remaining block according to the invention when a representative motion data block is a right-bottom block of a motion data storage unit.

(2) Case where a Representative Motion Data Block is a Right-Bottom Motion Data Block of a Motion Data Storage Unit FIG. 19 is a diagram schematically illustrating a method of compressing and storing motion information of a remaining block according to the invention when a representative motion data block is a right-bottom block of a motion data storage unit.

In FIG. 19, it is assumed that a motion data storage unit 1910 in a picture 1900 is a 16×16 pixel block and a remaining block 1920 is a 16×8 pixel block. The method to be described with reference to FIG. 19 may be applied to motion data storage units and remaining blocks having sizes other than described above.

When a right-bottom motion data block 1930 is used as the representative motion data block of the motion data storage unit 1910, the motion information of a motion data block 1940 located at the right-bottom corner of an available area of the remaining block 1920 is used as the motion information of the remaining block 1920.

Figure 20:
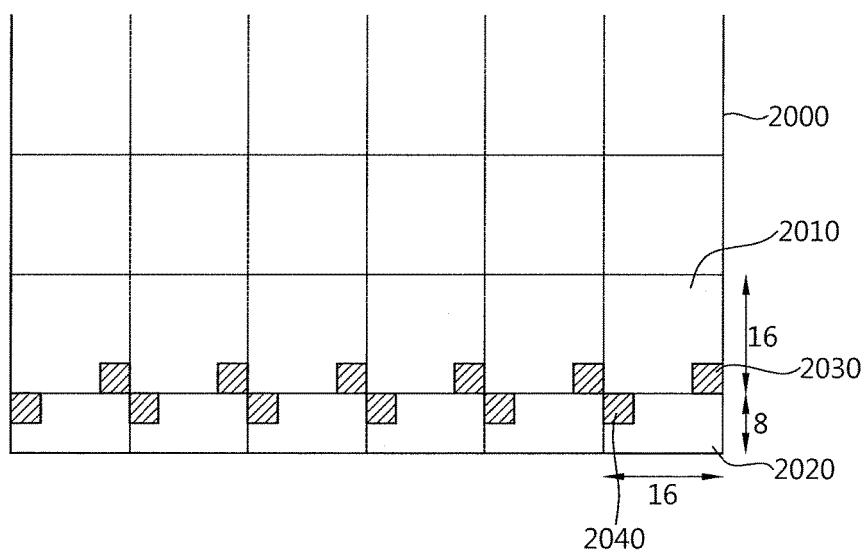
FIG. 20 is a diagram schematically illustrating a method of compressing and storing motion information of a remaining block when a representative motion data block is a right-bottom block of a motion data storage unit but an unavailable area is present in the remaining block.

FIG. 20 is a diagram schematically illustrating a method of compressing and storing motion information of a remaining block when a representative motion data block is a right-bottom block of a motion data storage unit but an unavailable area is present in the remaining block.

Specifically, when an unavailable area is present in a remaining block 2020, the motion information of a motion data block 2040 located at the top-left corner of the remaining block 2020 is used as the motion information of the remaining block 2020. In this case, since the top-left area is always available, it is not necessary to perform a calculating operation for searching for a boundary of an available block.

(3) Case where a Representative Motion Data Block is any One of Motion Data Blocks at the Center of a Motion Data Storage Unit The case where a representative motion data block is any one of motion data blocks at the center of a motion data storage unit means a case where a representative motion data block is any one of motion data blocks on the central top-left side, the central left-bottom side, the central top-right side, and the central right-bottom of a motion data storage unit. Hereinafter, for the purpose of convenience for explanation, the positions of the central motion data blocks are expressed by Center_XX. Here, XX represents any one of LT (Left-Top), RT (Right-Top), LB (Left-Bottom), and RB (Right-Bottom). What of LT, RT, LB, and RB to correspond to XX may be determined in advance or may be determined and signaled to the decoder by the encoder. For the purpose of convenience for explanation, it is assumed that XX is LT. The below description may be similarly applied to examples where XX is RT, RB, and LB.

Figure 21:
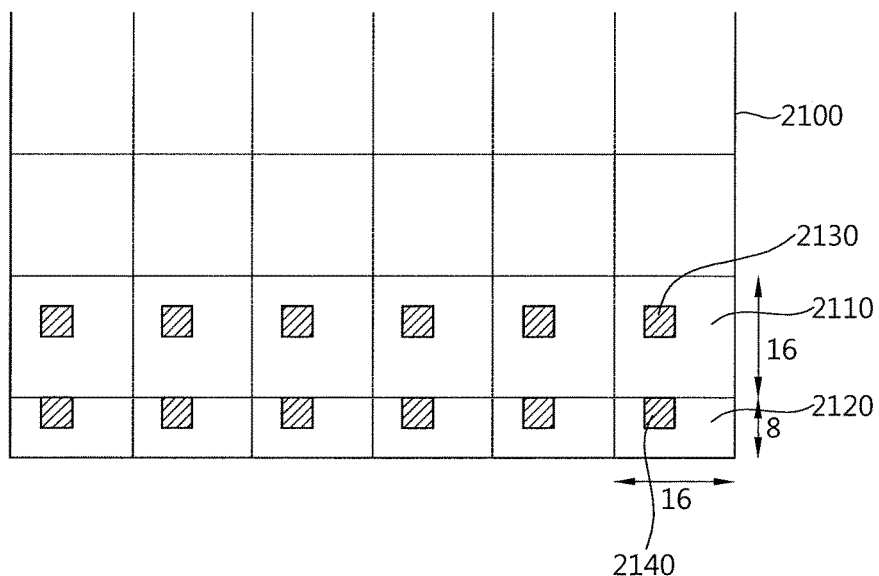
FIG. 21 is a diagram schematically illustrating a method of compressing and storing motion information of a remaining block according to the invention when a representative motion data block is a center top-left block of a motion data storage unit.

FIG. 21 is a diagram schematically illustrating a method of compressing and storing motion information of a remaining block according to the invention when a representative motion data block is a central left-top (Center_LT) block of a motion data storage unit.

In FIG. 21, it is assumed that a motion data storage unit 2110 in a picture 2100 is a 16×16 pixel block and a remaining block 2120 is a 16×8 pixel block. The method to be described with reference to FIG. 21 may be applied to motion data storage units and remaining blocks having sizes other than described above.

When a central right top motion data block 2130 is used as the representative motion data block of the motion data storage unit 2110, the motion information of a motion data block 2140 located on the central left-top side of an available area of the remaining block 2120 is used as the motion information of the remaining block 2120.

Figure 22:
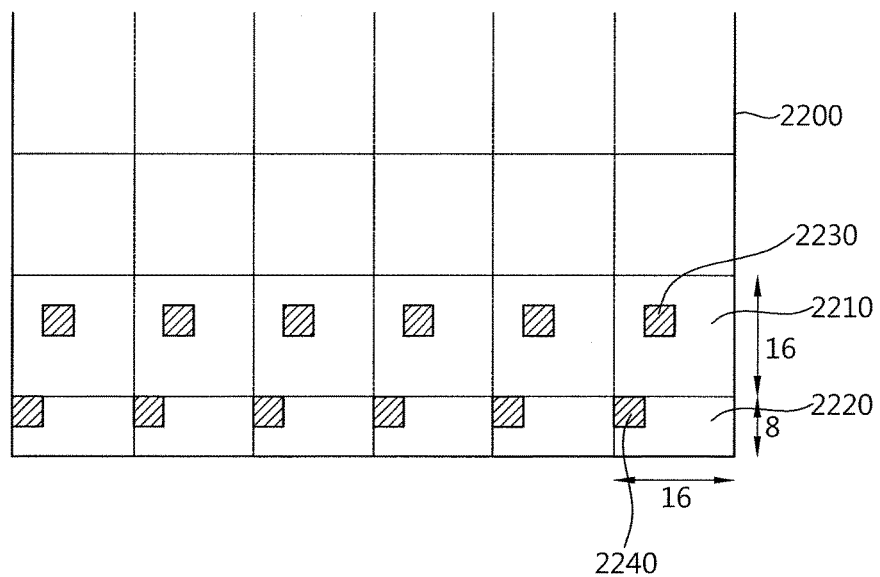
FIG. 22 is a diagram schematically illustrating a method of compressing and storing motion information of a remaining block when a representative motion data block is a center top-left block of a motion data storage unit but an unavailable area is present in the remaining block.

FIG. 22 is a diagram schematically illustrating a method of compressing and storing motion information of a remaining block when a representative motion data block is a central left-top block of a motion data storage unit but an unavailable area is present in the remaining block.

Specifically, when an unavailable area is present in a remaining block 2220, the motion information of a motion data block 2240 located at the top-left corner of the remaining block 2220 is used as the motion information of the remaining block 2220.

When an unavailable area is present in the remaining block 2220 but the unavailable area is a central left-top area in the remaining block 2220, the motion information of the motion data block 2240 located at the top-left corner of the remaining block 2220 may be used as the motion information of the remaining block 2220.

In the method described with reference to FIG. 22, since the left-top area is always available, it is not necessary to perform a calculating operation for searching for a boundary of an available block.

The decoder and the encoder use the motion information of a motion data storage unit including a pixel located at a corner adjacent to the right-bottom of the col block of a current block as the TMVP motion information in the process of deriving the TMVP for the inter prediction as shown in FIG. 5. The decoder and the encoder use the motion information of a representative motion data block out of the motion data blocks in the motion data storage unit as the motion information of the PUs in the motion data storage unit. The motion information of the representative motion data block of the motion data storage unit may include a reference index and a prediction mode in addition to a motion vector.

On the other hand, in motion vector prediction, the motion information of a block adjacent to a current block is used as an MVP candidate and the co-located motion vector of an adjacent frame (picture) is also used as an MVP candidate, as described above. This is called a TMVP (Temporal Motion Vector Predictor) as described above.

In order to use the TMVP, decoded information should be stored. Only when motion information such as a motion vector is stored in the unit of predetermined blocks (for example, 4×4 pixel block) after a frame (picture) is decoded, the TMVP may be used on the basis thereon in a next frame including a current block.

However, when it is intended to store all motion information in the minimum unit of 4×4, a lot of memory capacity is necessary. Accordingly, it is necessary to compress and store the motion information in a larger unit (for example, any one of a 16×16 pixel block, a 32×32 pixel block, and a 64×64 pixel block). This is described above as motion information storage reduction, motion vector memory compression, or motion vector buffer compression, and the unit of which the motion information is compressed and stored is described above as a motion data storage unit. Here, in what unit to compress and store motion information may be determined in advance or may be determined and transferred to the decoder through SPS (Sequence Parameter Set)-level signaling by the encoder.

For example, when it is assumed that motion information is compressed and stored in the unit of 16×16 pixel blocks for the purpose of convenience for explanation, the motion information (for example, the motion vector and the reference index) of a 4×4 block located at the top-left corner of the 16×16 pixel block is stored in the directions of L0 and L1. Here, the motion information of a 4×4 pixel block located at the center of the 16×16 pixel block may be used instead of the motion information the block located at the left-top corner.

Figure 23:
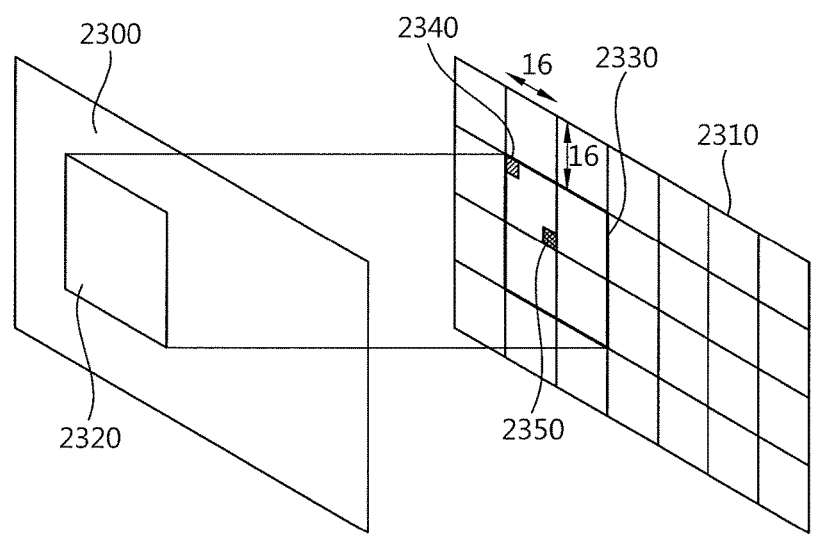
FIG. 23 is a diagram schematically illustrating an example where motion information located at the center is used as a TMVP instead of motion information located on the top-left side of a block located at the same position as a current block in a frame adjacent to a current frame.

FIG. 23 is a diagram schematically illustrating an example where motion information located at the center 2350 is used as a TMVP instead of motion data located at the left-top corner 2340 of a block 2330 located at the same position as a current block 2320 in a frame (or picture) 2310 adjacent to a current frame (or picture) 2300.

Details thereof are described above.

As described above, when a TMV (Temporal Motion Vector) to be used is a motion vector included in an intra block, it may not be said to be information useful for the inter prediction of a current block. In general, a TMV derived from an inter block may be set to have a value of (0, 0).

Figure 24:
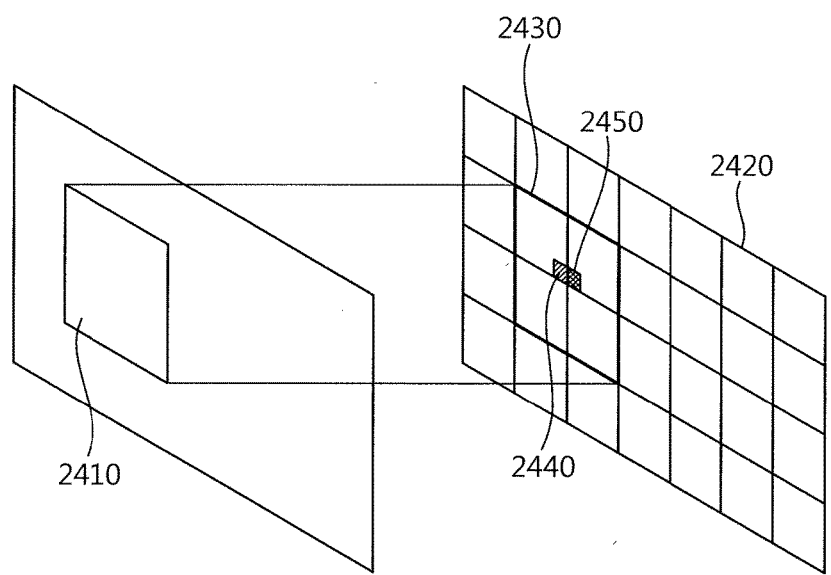
FIG. 24 is a diagram schematically illustrating a method of processing motion information of an inter block located at the center when deriving a TMVP.

FIG. 24 is a diagram schematically illustrating a method of processing motion information of an inter block located at the center when deriving a TMVP.

In FIG. 24, it is assumed that a block which a current block 2410 should use to derive a TMVP is a central block 2440 in the co-located block 2430 of a neighboring frame 2420. At this time, when the block 2440 is an intra block, the value of the motion vector derived from the block 2440 is set to (0, 0) and thus inaccurate prediction may be performed. When a neighboring block 2450 is an inter block and has a normal motion vector, it is not necessary to use the inaccurate motion vector of the block 2440.

On the other hand, as shown in FIG. 24, when motion information of a block located at the center of a block (col block) located at the same position as the current block in a neighboring frame (colPic) is used to derive a TMVP, any one (for example, the central left-top block) of four blocks surrounding the center may be used depending on the size of the block, instead of the central block of the co-located block (col block).

The details relevant to FIGS. 23 and 24 are described above, and embodiments for deriving a TMVP will be described below with reference to the accompanying drawings.

Embodiment 10

This embodiment provides a method of using motion information of blocks located at the center of a col block when it is intended to derive a TMVP of a current block having various sizes.

Figure 25:
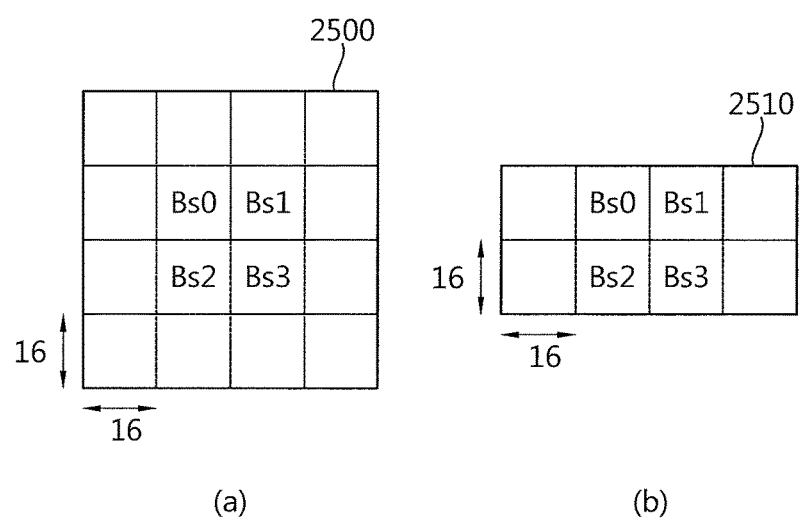
FIG. 25 is a diagram schematically illustrating a method of deriving a TMVP based on motion information of a block located at the center of a col block in a reference picture according to the invention.

FIG. 25 is a diagram schematically illustrating a method of deriving a TMVP based on motion information of a block located at the center of a col block in a reference picture (reference frame) according to the invention. FIG. 25 shows an example where a storage unit (motion data storage unit) of motion information (for example, a motion vector) is a 16×16 pixel block for the purpose of convenience for explanation. As described above, the size of the motion data storage unit may be determined in advance or may be determined and transferred to the decoder through SPS-level signaling by the encoder.

(a) of FIG. 25 shows an example where a current block and a col block 2500 of the current block are 64×64 pixel blocks. In (a) of FIG. 25, blocks Bs0, Bs1, Bs2, and Bs3 which are motion data storage units located at the center of the col block 2500 are used to derive the TMVP of the current block.

Specifically, any one of (1) motion information of a motion data storage unit Bs0 located at the central left-top corner of the col block, (2) motion information of a motion data storage unit Bs1 located at the central right-top corner of the col block, (3) motion information of a motion data storage unit Bs2 located at the central left-bottom corner of the col block, and (4) motion information of a motion data storage unit Bs3 located at the central right-bottom corner of the col block is used to derive the TMVP from the col block. What motion information of (1) to (4) to use may be determined in advance or may be determined and signaled to the decoder by the encoder.

The method (motion information storage reduction) of storing motion information by the motion data storage unit is described above in Embodiments 1 to 9, and the motion information stored through the use of the method according to any one of Embodiments 1 to 9 may be used in this embodiment.

(b) of FIG. 25 shows an example where a current block and a col block 2510 of the current block are 64×32 pixel blocks, unlike (a) of FIG. 25. In (b) of FIG. 25, blocks Bs0, Bs1, Bs2, and Bs3 which are motion data storage units located at the center of the col block 2510 are used to derive the TMVP of the current block.

Specifically, any one of (1) motion information of a motion data storage unit Bs0 located at the central left-top corner of the col block, (2) motion information of a motion data storage unit Bs1 located at the central right-top corner of the col block, (3) motion information of a motion data storage unit Bs2 located at the central left-bottom corner of the col block, and (4) motion information of a motion data storage unit Bs3 located at the central right-bottom corner of the col block is used to derive the TMVP from the col block 2510. What motion information of (1) to (4) to use may be determined in advance or may be determined and signaled to the decoder by the encoder.

Embodiment 11

This embodiment provides a method of considering present of an intra block when deriving a TMVP of a current block.

Figure 26:
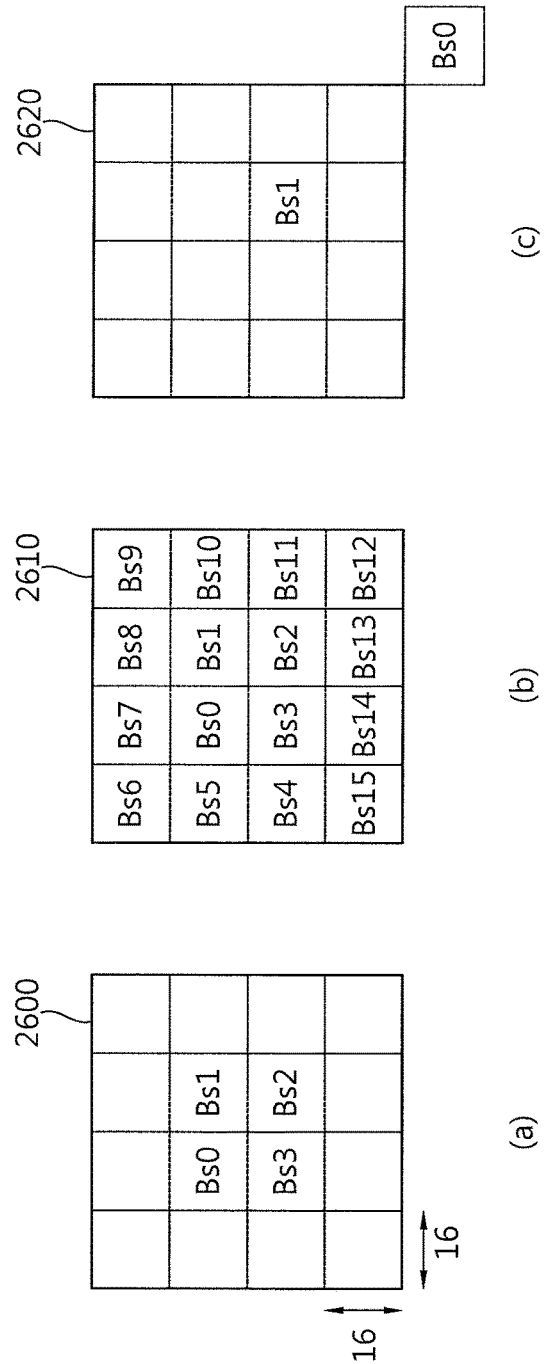
FIG. 26 is a diagram schematically illustrating a method of deriving a TMVP in consideration of presence or absence of an intra block according to the invention.

FIG. 26 is a diagram schematically illustrating a method of deriving a TMVP in consideration of presence or absence of an intra block according to the invention. FIG. 26 shows TMVP candidates of a reference frame located at the same position as a current block and being overlapped with the current block. Therefore, a block 2600, a block 2610, and a block 2620 may be considered as a current block or a col block of the current block. Here, for the purpose of convenience for explanation, it is assumed that the blocks are col blocks of a current block.

(a) of FIG. 26 is a diagram illustrating deriving of a TMVP using motion data storage units located at the center of a col block of a current block. For example, the TMVP candidate group in the example shown in (a) of FIG. 26 includes motion vectors of the motion data storage units Bs0, Bs1, Bs2, and Bs3. (a) of FIG. 26 shows an example where a 16×16 pixel block is used as a motion data storage unit.

In (a) of FIG. 26, it is determined whether a motion data storage unit is an intra block or an inter block and motion information of the motion data storage unit which is an inter block is used to derive the TMVP, instead of using the motion vector of the motion data storage unit as the TMVP thereof not depending on whether the motion data storage unit is an intra block or an inter block.

Therefore, the decoder scans fourth motion data storage units Bs0, Bs1, Bs2, and Bs3 located at the center of the col block in a predetermined scan order and the TMVP may be derived using the motion information of the motion data storage unit which is first detected as an inter block. When all of four motion data storage units Bs0, Bs1, Bs2, and Bs3 are intra blocks (or unavailable), the TMVP may be derived using the motion information of the motion data storage unit Bs0.

The scan order may be determined to be any one of (1) Bs0→Bs1→Bs2→Bs3, (2) Bs2→Bs3→Bs0→Bs1, (3) Bs0→Bs3→Bs1→Bs2, and (4) Bs0→Bs2→Bs1→Bs3. The scan order may be determined in advance, or may be determined and signaled to the decoder by the encoder.

(b) of FIG. 26 shows an example where the number of TMVP candidate groups in (a) of FIG. 26 increases. In (b) of FIG. 26, the motion information of all motion vector storage units in the col block are included in the TMVP candidate groups.

At this time, the scan order may be determined variously. In the index order of the motion data storage units, the scanning may be performed spirally in the clockwise direction from Bs0 or may be performed spirally in the counter-clockwise direction. The scanning may be performed with a block other than Bs0 out of the motion data storage units at the center of the col block as a start point (for example, Bs2→Bs3→Bs0→Bs1→Bs10→Bs11→Bs12→Bs13→Bs14→Bs15→Bs4→Bs5→Bs6→Bs7→Bs8→Bs9).

(c) of FIG. 26 is a diagram illustrating a method of deriving a TMVP using motion information of a block located outside a col block of a current block. A TMVP candidate may depart from the boundary of the col block (current block) or the TMVP candidate departing from the boundary of the col block (current block) may have a rank higher than a TMVP candidate in the col block (current block). (c) of FIG. 26 shows an example where a 16×16 pixel block is used as a motion data storage unit, for the purpose of convenience for explanation.

In (c) of FIG. 26, two TMVP candidate groups are used for the purpose of convenience for explanation. Motion information of a block Bs0 adjacent to the right-bottom corner of a col block 2620 as a block located outside the col block 2620 of the current block and a motion data storage unit Bs1 located at the central right-bottom corner out of blocks located at the center of the col block 2620 may be used as TMVP candidates. At this time, the block Bs0 may be a motion data storage unit.

The decoder first determines whether the block Bs0 outside the col block is an inter block (or an available block) or an intra block (or an unavailable block). When the block Bs0 is an inter block and is available, the decoder derives a TMVP using the motion information of the block Bs0. For example, the motion information of the block Bs0 may be used as the TMVP.

When the block Bs0 is an intra block or an unavailable block, the decoder determines whether the motion data storage unit Bs1 is an inter block (or an available block) or an intra block (or an unavailable block). When the block Bs1 is an inter block and is available, the decoder derives a TMVP using the motion information of the block Bs1.

When both the blocks Bs0 and Bs1 are intra blocks, the decoder may derive a TMVP on the basis of the motion information of Bs0.

The number, the positions, and the scan order of TMVP candidate groups in FIG. 26 are not limited to the above-mentioned details, and the size of the motion data storage unit is not limited to 16×16. The size of the current block and the col block is not limited 63×64, and the invention may be applied to various sizes such as 32×32. For example, when the size of a current block is 32×32 and the size of the motion data storage unit is 16×16, at most four TMVP candidates may be used for the current block.

When the size of a current block is smaller than the size of the motion vector memory buffer, that is, the motion data storage unit, the TMVP may be derived using the motion information of the left-top corner of the col block or the like in the same way as described in the existing method.

In the above description, a block index (BI or BsI, where I=0, 1, 2, 3, . . . ) is used to specify a block, but is not used to indicate the priority in the searching order or the processing order as long as it is not mentioned particularly.

The above-mentioned embodiments relate to the motion information storage and compression method in an inter prediction and the method of deriving a TMVP using the stored motion information, and may be applied to an encoder and a decoder in the same way so as for the encoder and the decoder to perform the same prediction. Therefore, the embodiments are described as the operations of the decoder for the purpose of convenience for explanation, but may be similarly applied to the encoder. For example, the invention includes embodiments in which the decoder in the above-mentioned embodiments is replaced with an "encoder".

In the above description, "motion information storage reduction", "motion vector memory compression", "motion vector buffer compression", "motion vector compression and storage", "motion information compression and storage", and the like are mixed depending on situations for the purpose of convenience for explanation, but they are intended for the purpose of convenience for explanation and may be used in the same meaning. The terms used for the purpose of convenience for explanation in the above description may be defined by the accompanying drawings and the relevant explanation thereof in addition to the used names.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes embodiments in which the above-mentioned embodiments are simultaneously applied or are combined.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween. In addition, the technical scope of the invention includes simultaneous application or combined application of the embodiments.

The invention claimed is:

1. A video encoding apparatus, comprising:
   a prediction module configured to determine an inter prediction based on a temporal motion vector predictor (TMVP) is applied for a current block in a current picture, to determine a positioning pixel for the temporal motion vector predictor (TMVP) of the current block in the current picture, to derive a co-located prediction block (colPb) in a reference picture based on the positioning pixel, to derive the temporal motion vector predictor (TMVP) of the current block in the current picture based on a motion vector of the co-located prediction block (colPb) in the reference picture, and to derive indication information indicating the inter prediction based on the temporal motion vector predictor (TMVP) is applied for the current block in the current picture; and
   an entropy encoding module configured to encode video information including the indicate information,
   wherein the co-located prediction block (colPb) is a prediction block covering a modified location that is determined based on a location of the positioning pixel, and
   wherein the positioning pixel is determined as a pixel at a right-bottom side among central four pixels located at the center of a co-located block in the reference picture, wherein the co-located block is a block corresponding to the current block and located in the reference picture.

2. The apparatus of claim 1, wherein the modified location is specified by ((xPCtr>>4)<<4, (yCtr>>4)<<4)), wherein (xPCtr, yPCtr) is the location of the positioning pixel.

3. The apparatus of claim 2, wherein the motion vector of the co-located prediction block covering the modified location is used as a representative motion vector of prediction blocks in the motion data storage unit area.

4. The apparatus of claim 1, wherein the modified location is a location at a top left corner in a motion data storage unit area encompassing the positioning pixel.

5. The apparatus of claim 1, wherein the co-located prediction block (colPb) is a located in a top-left corner of a 16×16 pixels block encompassing the positioning pixel.

6. The apparatus of claim 1, wherein the location of the positioning pixel is specified by (xP+(nPSW>>1), yP+(nPSH>>1)), wherein (xP, yP) is a location of a top left sample of the current block, nPSW and nPSH are width and height of the current block respectively.

7. The apparatus of claim 6, wherein the pixel at the right-bottom side among the central four pixels located at the center of the co-located block is determined as the positioning pixel when a bottom of the co-located block is a boundary of a largest coding unit.

8. The apparatus of claim 6, wherein the pixel at the right-bottom side among the central four pixels located at the center of the co-located block is determined as the positioning pixel when a pixel adjacent to a right-bottom corner of the co-located block is out of a boundary of a largest coding unit to which the co-located block belongs.

9. A video decoding apparatus, comprising:
a prediction module configured to determine an inter prediction based on a temporal motion vector predictor (TMVP) is applied for a current block in a current picture, to determine a positioning pixel for the temporal motion vector predictor (TMVP) of the current block in the current picture, to derive a co-located prediction block (colPb) in a reference picture based on the positioning pixel, to derive the temporal motion vector predictor (TMVP) of the current block in the current picture based on a motion vector of the co-located prediction block (colPb) in the reference picture, and to perform the inter prediction for the current block based on the TMVP derived based on the motion vector of the colPb in the reference picture,
wherein the co-located prediction block (colPb) is a prediction block covering a modified location that is determined based on a location of the positioning pixel, and
wherein the positioning pixel is determined as a pixel at a right-bottom side among central four pixels located at the center of a co-located block in the reference picture, wherein the co-located block is a block corresponding to the current block and located in the reference picture.

10. The apparatus of claim 9, wherein the modified location is specified by ((xPCtr>>4)<<4, (yCtr>>4)<<4)), wherein (xPCtr, yPCtr) is the location of the positioning pixel.

11. The apparatus of claim 9, wherein the modified location is a location at a top left corner in a motion data storage unit area encompassing the positioning pixel.

12. The apparatus of claim 9, wherein the motion vector of the co-located prediction block covering the modified location is used as a representative motion vector of prediction blocks in the motion data storage unit area.

13. The apparatus of claim 9, wherein the co-located prediction block (colPb) is a located in a top-left corner of a 16×16 pixels block encompassing the positioning pixel.

14. The apparatus of claim 9, wherein the location of the positioning pixel is specified by (xP+(nPSW>>1), yP+(nPSH>>1)), wherein (xP, yP) is a location of a top left sample of the current block, nPSW and nPSH are width and height of the current block respectively.

15. The apparatus of claim 14, wherein the pixel at the right-bottom side among the central four pixels located at the center of the co-located block is determined as the positioning pixel when a bottom of the co-located block is a boundary of a largest coding unit.

16. The apparatus of claim 14, wherein the pixel at the right-bottom side among the central four pixels located at the center of the co-located block is determined as the positioning pixel when a pixel adjacent to a right-bottom corner of the co-located block is out of a boundary of a largest coding unit to which the co-located block belongs.

17. A non-transitory decoder-readable storage medium storing encoded video information comprising encoded indication information generated by determining an inter prediction based on a temporal motion vector predictor (TMVP) is applied for a current block in a current picture, by determining a positioning pixel for the temporal motion vector predictor (TMVP) of the current block in the current picture, by deriving a co-located prediction block (colPb) in a reference picture based on the positioning pixel, by deriving the temporal motion vector predictor (TMVP) of the current block in the current picture based on a motion vector of the co-located prediction block (colPb) in the reference picture, by deriving indication information indicating the inter prediction based on the temporal motion vector predictor (TMVP) is applied for the current block in the current picture, and by encoding the indication information, wherein the co-located prediction block (colPb) is a prediction block covering a modified location that is determined based on a location of the positioning pixel, and wherein the positioning pixel is determined as a pixel at a right-bottom side among central four pixels located at the center of a co-located block in the reference picture, wherein the co-located block is a block corresponding to the current block and located in the reference picture.

* * * * *